United States Patent
Tanaka et al.

(10) Patent No.: US 11,349,410 B2
(45) Date of Patent: May 31, 2022

(54) SERIES MULTIPLEX INVERTER

(71) Applicant: Mitsubishi Electric Corporation, Tokyo (JP)

(72) Inventors: Kazufumi Tanaka, Tokyo (JP); Kazutoshi Kurahashi, Tokyo (JP); Yoshiaki Yamamoto, Tokyo (JP); Shuta Ishikawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/962,001

(22) PCT Filed: Jan. 30, 2018

(86) PCT No.: PCT/JP2018/003019
§ 371 (c)(1),
(2) Date: Jul. 14, 2020

(87) PCT Pub. No.: WO2019/150443
PCT Pub. Date: Aug. 8, 2019

(65) Prior Publication Data
US 2021/0075338 A1    Mar. 11, 2021

(51) Int. Cl.
*H02M 7/497*    (2007.01)
*H02M 1/088*    (2006.01)
(Continued)

(52) U.S. Cl.
CPC .......... *H02M 7/497* (2013.01); *H02M 1/088* (2013.01); *H02M 7/493* (2013.01); *H02M 1/0077* (2021.05); *H02M 1/12* (2013.01)

(58) Field of Classification Search
CPC .......... H02M 7/49; H02M 7/497; H02M 7/08; H02M 5/458; H02M 7/493; H02M 1/088; H02M 2001/0077; H02M 1/0077
See application file for complete search history.

(56) References Cited

U.S. PATENT DOCUMENTS 4,757,434 A * 7/1988 Kawabata .......... H02M 7/53873
                                                  363/41
5,446,646 A * 8/1995 Miyazaki .............. H02M 7/219
                                                  363/79
(Continued)

FOREIGN PATENT DOCUMENTS

JP    H06245532 A    9/1994
JP    2006006035 A   1/2006
(Continued)

OTHER PUBLICATIONS

Office Action dated Nov. 27, 2020, by the India Patent Office in corresponding India Patent Application No. 202027029773 and English translation of the Office Action. (5 pages).
(Continued)

*Primary Examiner* — Yusef A Ahmed
(74) *Attorney, Agent, or Firm* — Buchanan Ingersoll & Rooney PC

(57) ABSTRACT

A series multiplex inverter includes a power conversion unit, a phase difference selection unit, a drive signal generation unit, and a drive signal output unit. The phase difference selection unit selects, from among a plurality of phase difference candidates, the phase difference between rectangular wave voltages from a plurality of single-phase inverters. The drive signal generation unit generates a plurality of drive signals that causes the different single-phase inverters to output a plurality of rectangular wave voltages sequentially out of phase by the phase difference selected by the phase difference selection unit. The drive signal output unit outputs the plurality of drive signals generated by the drive signal generation unit to the plurality of single-phase inverters.

4 Claims, 12 Drawing Sheets

(51) Int. Cl.
*H02M 7/493* (2007.01)
*H02M 1/00* (2006.01)
*H02M 1/12* (2006.01)

(56) References Cited

U.S. PATENT DOCUMENTS

| | | | | |
|---|---|---|---|---|
| 6,147,475 | A * | 11/2000 | Bridgeman | H02J 3/1828 323/211 |
| 6,169,677 | B1 * | 1/2001 | Kitahata | H02M 7/49 363/71 |
| 6,388,416 | B1 * | 5/2002 | Nakatani | H02P 6/20 318/722 |
| 6,493,246 | B2 * | 12/2002 | Suzui | H02J 7/35 363/95 |
| 9,438,143 | B2 | 9/2016 | Suzuki | |
| 10,651,739 | B1 * | 5/2020 | Li | H02S 20/32 |
| 2001/0026461 | A1 * | 10/2001 | Jensen | H02M 3/1584 363/71 |
| 2003/0080741 | A1 * | 5/2003 | LeRow | H02M 7/493 324/320 |
| 2003/0218888 | A1 * | 11/2003 | Suzui | H02J 3/383 363/34 |
| 2008/0103495 | A1 * | 5/2008 | Mihori | A61B 18/1206 606/38 |
| 2008/0203962 | A1 * | 8/2008 | Maeda | H02P 6/16 318/723 |
| 2009/0003022 | A1 * | 1/2009 | Nunoya | H02J 50/40 363/78 |
| 2012/0242410 | A1 * | 9/2012 | Darwish | H03F 1/0266 330/288 |
| 2012/0250370 | A1 * | 10/2012 | Taniguchi | H02M 3/33561 363/34 |
| 2013/0187473 | A1 * | 7/2013 | Deboy | H02M 7/49 307/82 |
| 2014/0239854 | A1 * | 8/2014 | Suzuki | H02P 5/68 318/35 |
| 2015/0016155 | A1 * | 1/2015 | Lee | H02M 7/219 363/44 |
| 2016/0003754 | A1 * | 1/2016 | Ishikawa | H02M 7/53871 702/136 |
| 2016/0072395 | A1 * | 3/2016 | Deboy | H02M 7/49 363/21.1 |
| 2016/0072398 | A1 * | 3/2016 | Deboy | H02M 7/23 363/21.1 |
| 2016/0372927 | A1 * | 12/2016 | Dent | H02M 1/126 |
| 2017/0072226 | A1 * | 3/2017 | Matsui | B06B 1/0253 |
| 2017/0104422 | A1 * | 4/2017 | Okumura | H02M 3/28 |
| 2017/0294864 | A1 * | 10/2017 | Tada | H02P 27/085 |
| 2017/0302154 | A1 * | 10/2017 | Tada | H02M 7/483 |
| 2017/0305282 | A1 * | 10/2017 | Obayashi | H02J 50/12 |
| 2017/0366023 | A1 * | 12/2017 | Tanaka | H02J 7/35 |
| 2019/0172683 | A1 * | 6/2019 | Mavretic | H01L 28/20 |
| 2019/0207526 | A1 * | 7/2019 | Sanada | H02M 3/33584 |
| 2020/0091831 | A1 * | 3/2020 | Kadota | H02M 7/219 |
| 2020/0220489 | A1 * | 7/2020 | Nakamura | H02M 7/53871 |
| 2020/0235655 | A1 * | 7/2020 | Hayashi | H02J 9/06 |
| 2021/0010707 | A1 * | 1/2021 | Takahashi | H02J 3/1892 |
| 2021/0067054 | A1 * | 3/2021 | Tanaka | H02M 5/4585 |

FOREIGN PATENT DOCUMENTS

| | | |
|---|---|---|
| JP | 2014-165982 A | 9/2014 |
| JP | 2016-140137 A | 8/2016 |
| JP | 2017034737 A | 2/2017 |

OTHER PUBLICATIONS

International Search Report (PCT/ISA/210) dated Mar. 6, 2018, by the Japan Patent Office as the International Searching Authority for International Application No. PCT/JP2018/003019.
Written Opinion (PCT/ISA/237) dated Mar. 6, 2018, by the Japan Patent Office as the International Searching Authority for International Application No. PCT/JP2018/003019.

* cited by examiner

FIRST PHASE DIFFERENCE φ1

FIRST PHASE DIFFERENCE φ1

SERIES MULTIPLEX INVERTER

FIELD

The present invention relates to a series multiplex inverter including a plurality of single-phase inverters having output terminals connected in series.

BACKGROUND

Conventionally known series multiplex inverters includes a plurality of single-phase inverters to output rectangular wave voltages out of phase with each other, combine the rectangular wave voltages, and output the combined voltage. Regarding this type of series multiplex inverter, Patent Literature 1 discloses a technique of calculating the phase angle of a rectangular wave voltage output from each single-phase inverter such that the harmonic of each order included in the output voltage from the series multiplex inverter has a desired value or less. The single-phase inverters then individually output a rectangular wave voltage at the calculated phase angle.

CITATION LIST

Patent Literature

Patent Literature 1: Japanese Patent Application Laid-open No. H6-245532

SUMMARY

Technical Problem

The conventional series multiplex inverter can perform control such that the harmonic voltage of each order included in the output voltage from the series multiplex inverter has a desired value or less, but takes no account of the harmonic current flowing through the load connected to the series multiplex inverter. Because the easiness of flow of the harmonic current of each order varies depending on the characteristics of the load connected to the series multiplex inverter, even when the harmonic voltage of each order included in the output voltage from the series multiplex inverter is suppressed, the magnitude of the harmonic current of each order varies depending on the characteristics of the load. Therefore, an attempt to suppress the harmonic current of each order from the series multiplex inverter to the load regardless of the characteristics of the load requires a large harmonic filter having a high harmonic reduction effect, resulting in an increase in the size of the series multiplex inverter.

The present invention has been made in view of the above, and an object thereof is to obtain a series multiplex inverter capable of suppressing the harmonic current flowing through the load by controlling each single-phase inverter even when the characteristics of the load vary.

Solution to Problem

In order to solve the above-described problems and achieve the object, a series multiplex inverter of the present invention comprises a power conversion unit, a phase difference selection unit, a drive signal generation unit, and a drive signal output unit. The power conversion unit includes a plurality of single-phase inverters having output terminals connected in series. The phase difference selection unit selects, from among a plurality of phase difference candidates, a phase difference between rectangular wave voltages from the plurality of single-phase inverters. The drive signal generation unit generates a plurality of drive signals that causes different single-phase inverters to output a plurality of rectangular wave voltages sequentially out of phase by the phase difference selected by the phase difference selection unit. The drive signal output unit outputs the plurality of drive signals generated by the drive signal generation unit to the plurality of single-phase inverters.

Advantageous Effects of Invention

The present invention can achieve the effect of suppressing the harmonic current flowing through the load by controlling each single-phase inverter even when the characteristics of the load vary.

DESCRIPTION OF EMBODIMENTS

Hereinafter, series multiplex inverters according to embodiments of the present invention will be described in detail based on the drawings. The present invention is not limited to the embodiments.

First Embodiment

Figure 1:
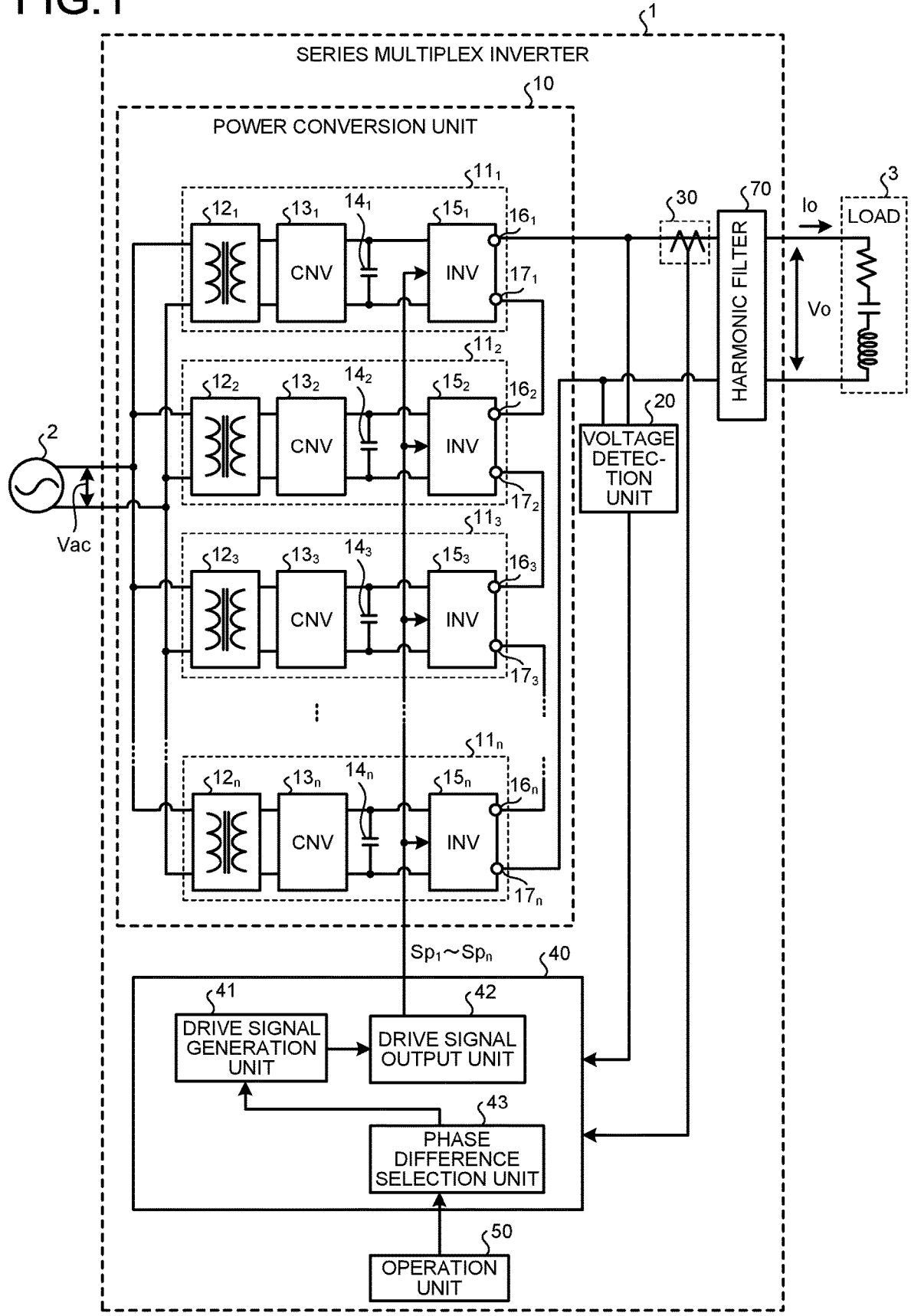
FIG. 1 is a diagram illustrating an exemplary configuration of a series multiplex inverter according to a first embodiment of the present invention.

FIG. 1 is a diagram illustrating an exemplary configuration of a series multiplex inverter according to the first embodiment of the present invention. As illustrated in FIG. 1, the series multiplex inverter 1 according to the first embodiment includes a power conversion unit 10, a voltage detection unit 20, a current detection unit 30, a control unit 40, an operation unit 50, and a harmonic filter 70. The control unit 40 controls the power conversion unit 10 such that the output voltage Vo is output from the power conversion unit 10.

The power conversion unit 10 can convert AC power output from a single-phase AC power supply 2 into AC power having some frequency and amplitude. For example, the power conversion unit 10 can convert AC power output from the single-phase AC power supply 2 into high-frequency AC power having a fundamental frequency of 1 kHz or more. Note that the power conversion unit 10 can also convert AC power output from the single-phase AC power supply 2 into AC power having a fundamental frequency of less than 1 kHz.

The power conversion unit 10 includes n power conversion blocks $11_1$ to $11_n$. Here, "n" is an integer of two or more. The power conversion block $11_1$ includes a transformer $12_1$, a rectifier circuit $13_1$, a capacitor $14_1$, and a single-phase inverter $15_1$. The power conversion block $11_2$ includes a transformer $12_2$, a rectifier circuit $13_2$, a capacitor $14_2$, and a single-phase inverter $15_2$.

Similarly to the power conversion blocks $11_1$ and $11_2$, each of the power conversion blocks $11_3$ to $11_n$ includes one of transformers $12_3$ to $12_n$, one of rectifier circuits $13_3$ to $13_n$, one of capacitors $14_3$ to $14_n$, and one of single-phase inverters $15_3$ to $15_n$. The power conversion blocks $11_1$ to $11_n$ have the same configuration, as stated above. Hereinafter, therefore, the configuration of the power conversion block $11_1$ will be described in detail.

The primary winding of the transformer $12_1$ is connected to the single-phase AC power supply 2. The transformer $12_1$ converts the AC voltage Vac output from the single-phase AC power supply 2 into an AC voltage having an amplitude that depends on the winding ratio of the transformer $12_1$, and outputs the AC voltage.

The rectifier circuit $13_1$ is connected to the secondary winding of the transformer $12_1$, and rectifies the AC voltage output from the transformer $12_1$. The rectifier circuit $13_1$ is, for example, a full-wave rectifier circuit, a half-wave rectifier circuit, or a full-bridge circuit. Note that the rectifier circuit $13_1$ only needs to be able to rectify the AC voltage output from the transformer $12_1$, and is not necessarily a full-wave rectifier circuit, a half-wave rectifier circuit, or a full-bridge circuit.

The capacitor $14_1$ smooths the output voltage from the rectifier circuit $13_1$. The rectifier circuit $13_1$ and the capacitor $14_1$ convert the AC voltage output from the transformer $12_1$ into the DC voltage Vdc.

The single-phase inverter $15_1$ is controlled by the control unit 40, such that the single-phase inverter $15_1$ can convert the DC voltage Vdc generated by the rectifier circuit $13_1$ and the capacitor $14_1$ into a rectangular wave voltage and output the rectangular wave voltage.

The power conversion blocks $11_2$ to $11_n$ generate and output rectangular wave voltages, similarly to the power conversion block $11_1$. Hereinafter, the AC voltages output from the single-phase inverters $15_1$ to $15_n$ will be respectively referred to as the output voltages $V_{INV1}$ to $V_{INVn}$ for easy understanding. Note that the output voltages $V_{INV1}$ to $V_{INVn}$ may be collectively referred to as the output voltage $V_{INV}$.

Output terminals $16_1, 17_1, 16_2, 17_2, \ldots, 16_{n-1}, 17_{n-1}, 16_n$, and $17_n$ of the single-phase inverters $15_1$ to $15_n$ are connected in series. Consequently, the output voltages $V_{INV1}$ to $V_{INVn}$ from the single-phase inverters $15_1$ to $15_n$ are combined, and a result of the combination is output as the output voltage Vo from the power conversion unit 10.

The output voltage Vo from the power conversion unit 10 is supplied to a load 3 via the harmonic filter 70. The harmonic filter 70 is, for example, an LC filter, but may be an LCL filter.

Hereinafter, the transformers $12_1$ to $12_n$ may be collectively referred to as the transformer 12, and the rectifier circuits $13_1$ to $13_n$ may be collectively referred to as the rectifier circuit 13. The capacitors $14_1$ to $14_n$ may be collectively referred to as the capacitor 14, and the single-phase inverters $15_1$ to $15_n$ may be collectively referred to as the single-phase inverter 15.

In the exemplary configuration illustrated in FIG. 1, each of the power conversion blocks $11_1$ to $11_n$ includes the transformer 12, the rectifier circuit 13, and the capacitor 14. Alternatively, a DC power supply that outputs the DC voltage Vdc may be provided instead of the transformer 12, the rectifier circuit 13, and the capacitor 14.

Figure 2:
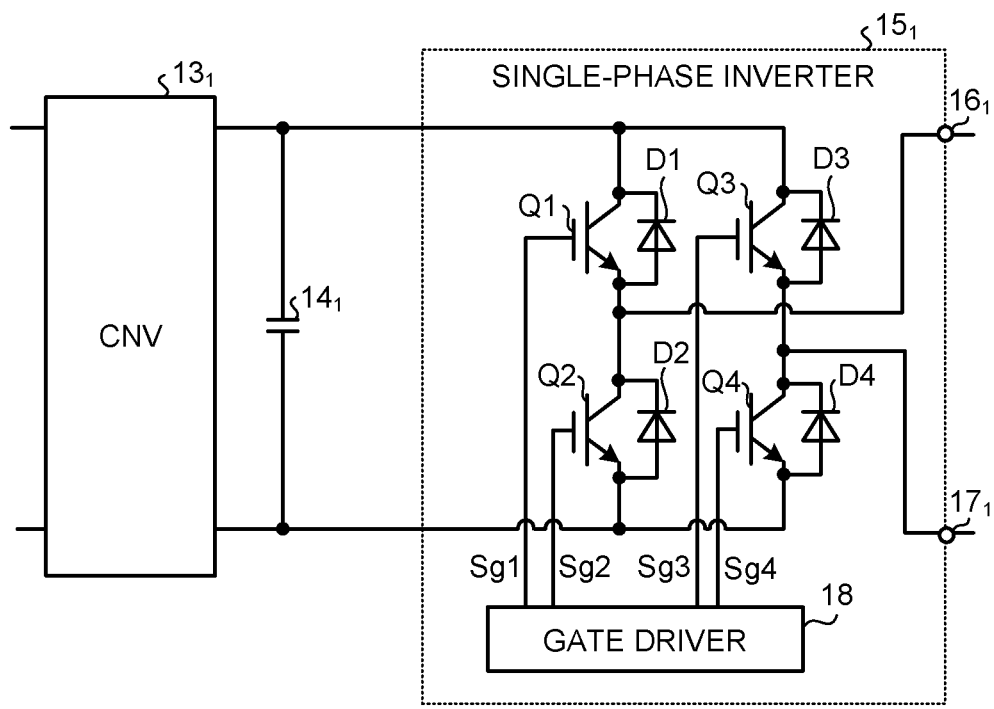
FIG. 2 is a diagram illustrating an exemplary configuration of a single-phase inverter according to the first embodiment.

FIG. 2 is a diagram illustrating an exemplary configuration of a single-phase inverter according to the first embodiment. As illustrated in FIG. 2, the single-phase inverter $15_1$ includes four switching elements Q1 to Q4 connected in full bridge configuration, diodes D1 to D4 connected in anti-parallel to the switching elements Q1 to Q4, respectively, and a gate driver 18.

The gate driver 18 generates gate signals Sg1 to Sg4 on the basis of a drive signal (described later) output from the control unit 40, and outputs each of the generated gate signals Sg1 to Sg4 to the corresponding one of the gates of the switching elements Q1 to Q4. Consequently, the switching elements Q1 to Q4 are subjected to on/off control, such that the output voltage $V_{INV1}$ is generated and output by the single-phase inverter $15_1$. The switching elements Q1 to Q4 are semiconductor switching elements represented by metal-oxide-semiconductor field-effect transistors (MOSFETs) and insulated gate bipolar transistors (IGBTs).

Figure 3:
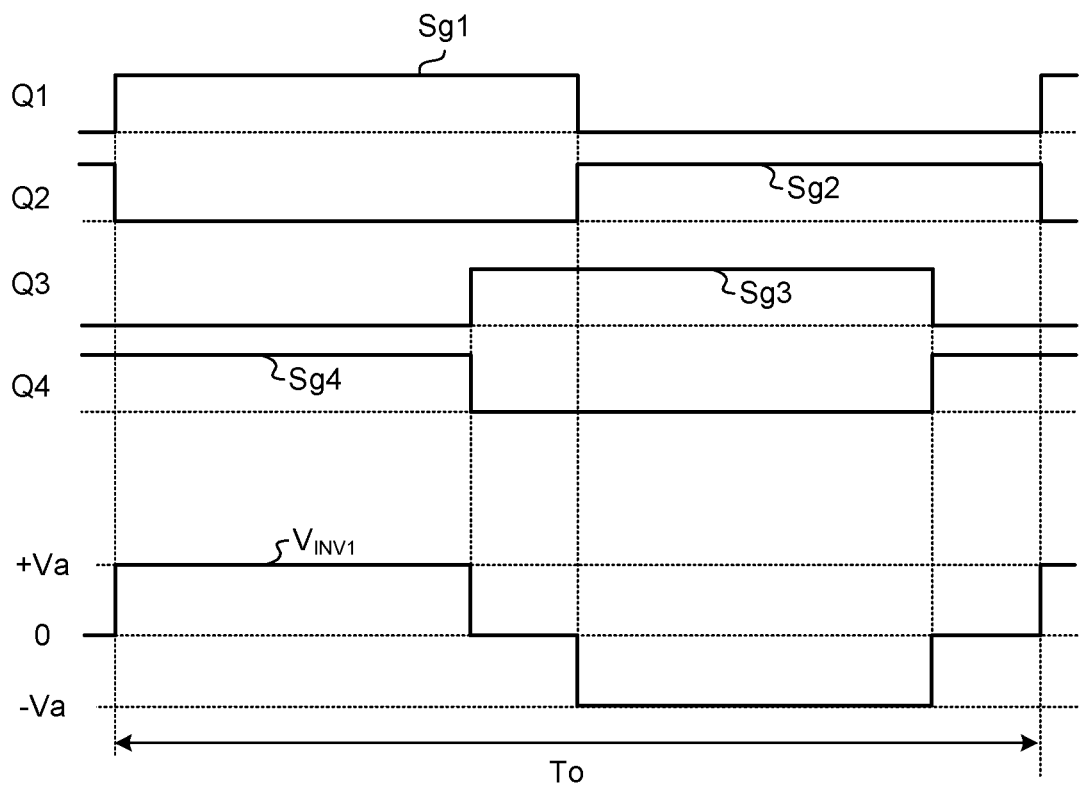
FIG. 3 is a diagram illustrating the relationship between gate signals output from a gate driver and the waveform of the output voltage from a single-phase inverter according to the first embodiment.

FIG. 3 is a diagram illustrating the relationship between gate signals output from a gate driver and the waveform of the output voltage from a single-phase inverter according to the first embodiment. As illustrated in FIG. 3, the output voltage $V_{INV1}$ including a rectangular wave voltage is generated by the gate signals Sg1 to Sg4. In FIG. 3, "To" is an output voltage period indicating the fundamental period of the output voltage Vo from the series multiplex inverter 1. In addition, "+Va" is the voltage value of a positive rectangular wave voltage output from the single-phase inverter $15_1$, and "−Va" is the voltage value of a negative rectangular wave voltage output from the single-phase inverter $15_1$.

A drive signal output from the control unit 40 to the single-phase inverter 15 includes four pulse width modulation (PWM) signals having the same waveform as the respective gate signals Sg1 to Sg4, and is amplified by the gate driver 18 and output to the switching elements Q1 to Q4. Note that this is a non-limiting example of a drive signal, and any drive signal can be used as long as the gate driver 18 can generate the gate signals Sg1 to Sg4 on the basis of the drive signal from the control unit 40. For example, a drive signal output from the control unit 40 to each single-phase inverter 15 may include one or two PWM signals. That is, the gate driver 18 may be configured to generate and output the gate signals Sg1 to Sg4 from a drive signal including one or two PWM signals.

The single-phase inverters $15_2$ to $15_n$ have the same configuration as the single-phase inverter $15_1$. Note that the single-phase inverters $15_1$ to $15_n$ are not limited to the configuration illustrated in FIG. 2. That is, the single-phase inverters $15_1$ to $15_n$ only need to be able to output the output voltages $V_{INV1}$ to $V_{INVn}$ (described later), and do not necessarily have the configuration illustrated in FIG. 2.

Reference is made back to FIG. 1 to continue the explanation of the series multiplex inverter 1. The voltage detection unit 20 of the series multiplex inverter 1 repeatedly detects the instantaneous value of the output voltage Vo from the power conversion unit 10, and outputs the detected voltage value Vdet that is the detected instantaneous value of the output voltage Vo. The current detection unit 30 of the series multiplex inverter 1 repeatedly detects the instantaneous value of the output current Io from the power conversion unit 10, and outputs the detected current value Idet that is the detected instantaneous value of the output current Io.

The control unit 40 of the series multiplex inverter 1 includes a drive signal generation unit 41, a drive signal output unit 42, and a phase difference selection unit 43. The drive signal output unit 42 generates n drive signals $Sp_1$ to $Sp_n$. The drive signal output unit 42 outputs the n drive signals $Sp_1$ to $Sp_n$ to the n single-phase inverters $15_1$ to $15_n$. Hereinafter, the drive signals $Sp_1$ to $Sp_n$ may be collectively referred to as the drive signal Sp.

The drive signal generation unit 41 generates the n drive signals Sp by constant output current control on the basis of the detected current value Idet. Each drive signal Sp includes, for example, a plurality of PWM signals as described above. Note that the drive signal generation unit 41 can also generate the n drive signals Sp by constant output voltage control or constant output power control. For example, the drive signal generation unit 41 can generate the n drive signals Sp by constant output voltage control on the basis of the detected voltage value Vdet.

The drive signal generation unit 41 can generate the n drive signals Sp by constant output power control on the basis of the detected voltage value Vdet and the detected current value Idet. In a case where the drive signal generation unit 41 performs only constant output current control, the voltage detection unit 20 may not be provided.

The drive signals $Sp_1$ to $Sp_n$ are signals that cause different ones of the n single-phase inverters 15 to output n rectangular wave voltages sequentially out of phase by the first phase difference φ1 (described later). Hereinafter, an exemplary configuration of the drive signal generation unit 41 will be described.

Figure 4:
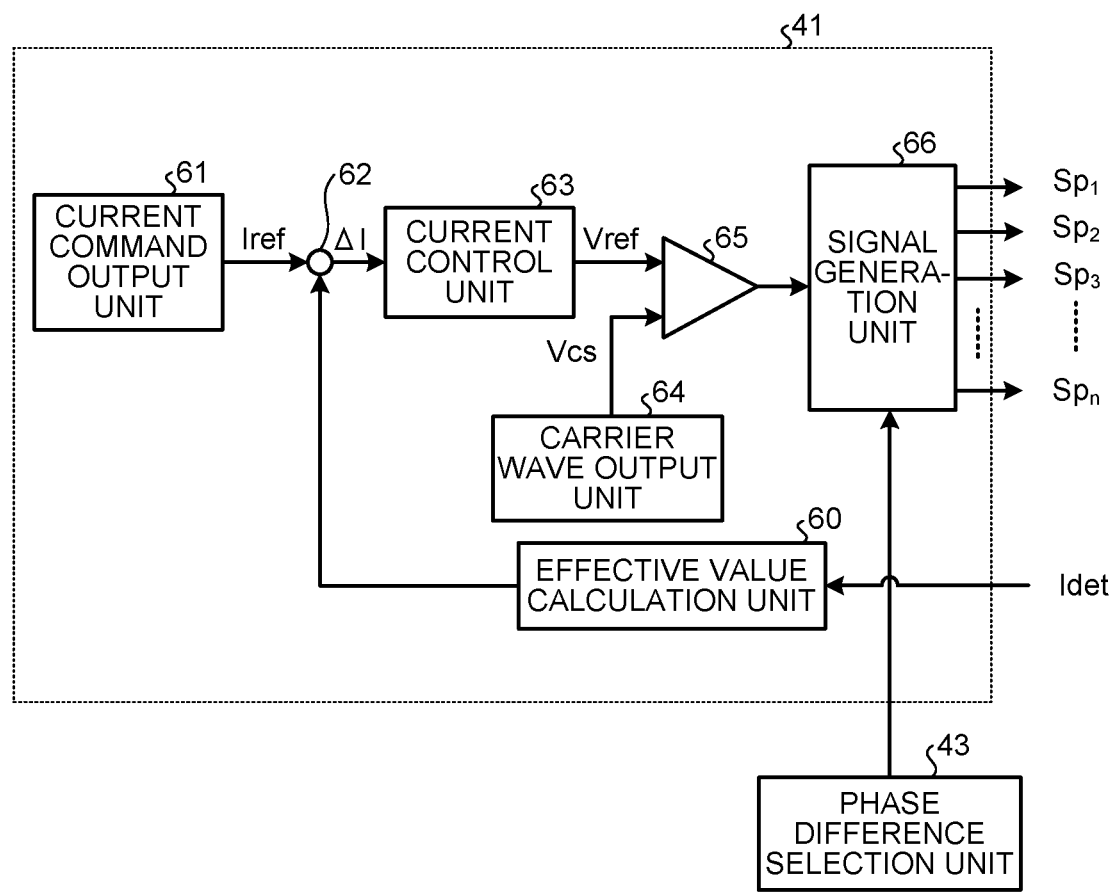
FIG. 4 is a diagram illustrating an exemplary configuration of a drive signal generation unit according to the first embodiment.

FIG. 4 is a diagram illustrating an exemplary configuration of the drive signal generation unit according to the first embodiment. As illustrated in FIG. 4, the drive signal generation unit 41 includes an effective value calculation unit 60, a current command output unit 61, a subtractor 62, a current control unit 63, a carrier wave output unit 64, a comparator 65, and a signal generation unit 66.

The effective value calculation unit 60 calculates the output current effective value IoM, which is the effective value of the output current Io, on the basis of the detected current value Idet output from the current detection unit 30. The effective value calculation unit 60 calculates the output current effective value IoM, for example, every half output voltage period To. The output voltage period To is the fundamental period of the output voltage Vo as described above, and To=1/fo is satisfied. Note that "fo" is the frequency of the output voltage Vo, and is hereinafter referred to as the output voltage frequency fo.

The current command output unit 61 outputs the current command Iref. The value of the current command Iref is generated by the current command output unit 61 on the basis of, for example, information supplied from the outside to the current command output unit 61.

The subtractor 62 subtracts the output current effective value IoM from the current command Iref, and outputs the current difference value ΔI as the result of the subtraction. The current control unit 63 generates the voltage command Vref on the basis of the current difference value ΔI output from the subtractor 62. The current control unit 63 can generate the voltage command Vref by, for example, proportional integral control or proportional integral derivative control.

The carrier wave output unit 64 generates the carrier wave Vcs and outputs the generated carrier wave Vcs. The carrier wave Vcs is, for example, a voltage having a triangular waveform or a voltage having a sawtooth waveform. The output voltage period To is the same as the period of the carrier wave Vcs. When the period of the carrier wave Vcs changes, the output voltage period To changes.

The comparator 65 compares the voltage command Vref with the carrier wave Vcs, and outputs the result of the comparison. Specifically, the comparator 65 outputs the first voltage V1 when the voltage command Vref is larger than the carrier wave Vcs, and outputs the second voltage V2 different from the first voltage V1 when the voltage command Vref is smaller than the carrier wave Vcs.

The signal generation unit 66 generates the n drive signals $Sp_1$ to $Sp_n$ on the basis of the voltage output from the comparator 65. The signal generation unit 66 has information indicating the first phase difference φ1 input from the phase difference selection unit 43. The signal generation unit 66 also determines the second phase difference φ2 on the basis of the duty ratio of the voltage output from the comparator 65. For example, the signal generation unit 66 determines the second phase difference φ2 such that the shorter the time during which the second voltage V2 is output from the comparator 65 is, the smaller the second phase difference φ2 is, in half period of the carrier wave Vcs.

The signal generation unit 66 generates the n drive signals $Sp_1$ to $Sp_n$ on the basis of the first phase difference φ1 and the second phase difference φ2. The signal generation unit 66 outputs the generated n drive signals $Sp_1$ to $Sp_n$ to the drive signal output unit 42 illustrated in FIG. 1.

The single-phase inverters $15_1$ to $15_n$ output the output voltages $V_{INV1}$ to $V_{INVn}$ from the output terminals $16_1$, $17_1$, $16_2$, $17_2$, ..., $16_{n-1}$, $17_{n-1}$, $16_n$, and $17_n$ on the basis of the drive signals $Sp_1$ to $Sp_n$ output from the drive signal output unit 42. The output voltages $V_{INV1}$ to $V_{INVn}$ from the single-phase inverters $15_1$ to $15_n$ are combined, and the result of the combination is output as the output voltage Vo from the power conversion unit 10.

Figure 5:
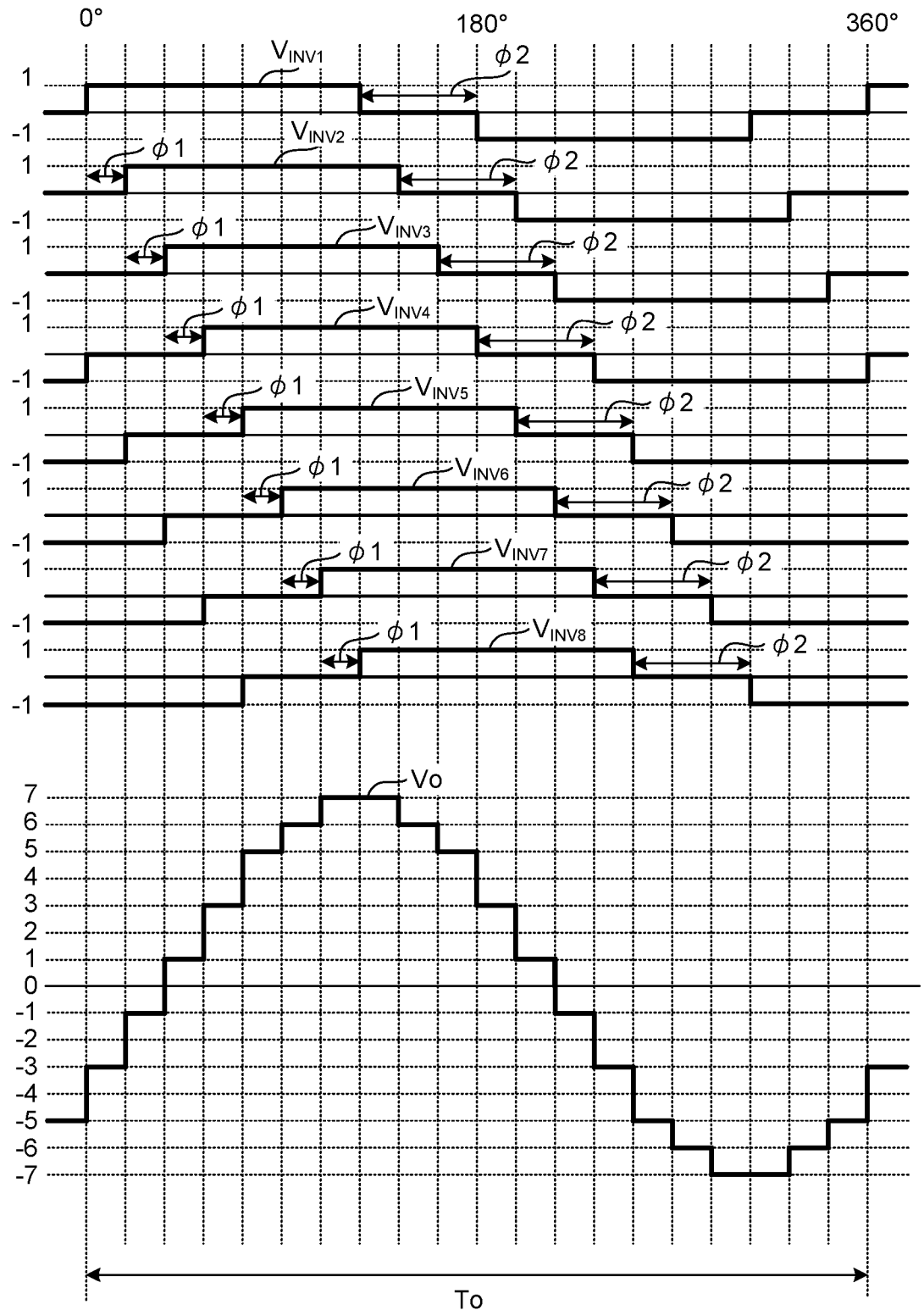
FIG. 5 is a diagram illustrating an example of output voltages from a plurality of single-phase inverters according to the first embodiment.
Figure 6:
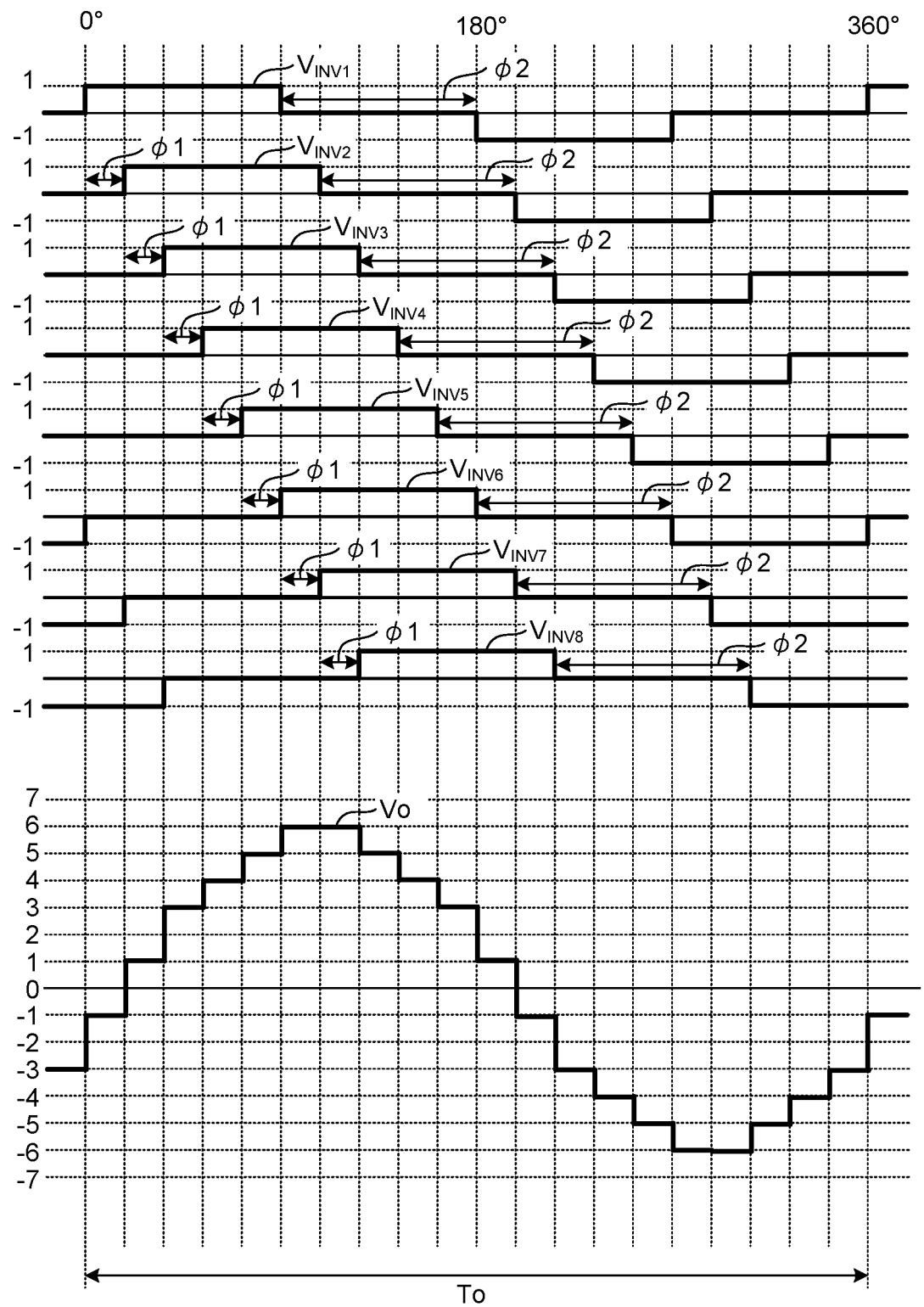
FIG. 6 is a diagram illustrating an example of output voltages from a plurality of single-phase inverters according to the first embodiment.
Figure 7:
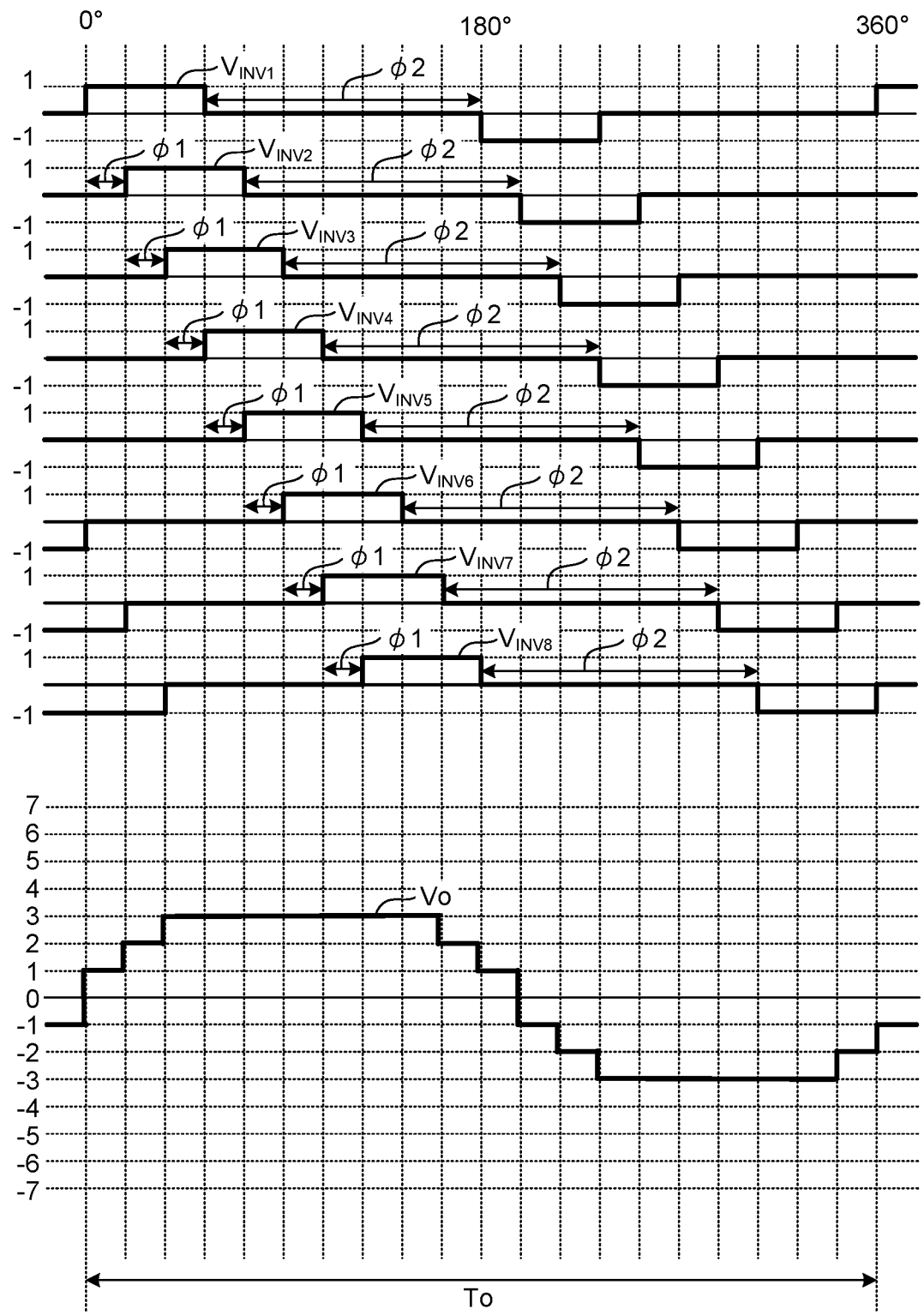
FIG. 7 is a diagram illustrating an example of output voltages from a plurality of single-phase inverters according to the first embodiment.

Here, the output voltages $V_{INV1}$ to $V_{INVn}$ from the single-phase inverters $15_1$ to $15_n$ will be described in detail with reference to FIGS. 5 to 7. FIGS. 5 to 7 are diagrams illustrating examples of output voltages from a plurality of single-phase inverters according to the first embodiment. In the examples of FIGS. 5 to 7, n=8 is satisfied, that is, the number of single-phase inverters 15 is eight, and the drive signals $Sp_1$ to $Sp_8$ are sequentially input in a one-to-one correspondence to the single-phase inverters $15_1$ to $15_8$ in order of $Sp_1$ to Spa.

Specifically, the drive signal $Sp_1$ is input to the single-phase inverter $15_1$, the drive signal $Sp_2$ is input to the single-phase inverter $15_2$, the drive signal $Sp_3$ is input to the single-phase inverter $15_3$, and the drive signal $Sp_4$ is input to the single-phase inverter $15_4$. Similarly, the drive signal $Sp_5$ is input to the single-phase inverter $15_5$, the drive signal $Sp_6$ is input to the single-phase inverter $15_6$, the drive signal $Sp_7$ is input to the single-phase inverter $15_7$, and the drive signal $Sp_8$ is input to the single-phase inverter $15_8$.

In FIGS. 5 to 7, "1" means the above-mentioned "+Va" which is the voltage value of a positive rectangular wave voltage output from the single-phase inverter 15, and "−1" means the above-mentioned "−Va" which is the voltage value of a negative rectangular wave voltage output from the single-phase inverter 15. Also, "2" to "7" mean multiples of "+Va", and "−2" to "−7" mean multiples of "−Va". In FIGS. 5 to 7, the vertical axis represents the instantaneous value of the output voltage Vo, and the horizontal axis represents the phase of the output voltage Vo. The interval between vertical dashed lines is 18°. Hereinafter, the phase of the output voltage Vo is referred to as the output voltage phase θo.

As illustrated in FIG. 5, the output voltages $V_{INV1}$ to $V_{INV8}$ are sequentially out of phase by the first phase difference φ1. Specifically, the output voltages $V_{INV1}$ to $V_{INV8}$ become positive rectangular wave voltages at timings sequentially out of phase by the first phase difference φ1, and become negative rectangular wave voltages at timings sequentially out of phase by the first phase difference φ1. In the example illustrated in FIG. 5, φ1=18° is satisfied.

For example, the positive rectangular wave voltage at the output voltage $V_{INV2}$ is out of phase with the positive rectangular wave voltage at the output voltage $V_{INV1}$ by the first phase difference φ1. The positive rectangular wave voltage at the output voltage $V_{INV3}$ is out of phase with the positive rectangular wave voltage at the output voltage $V_{INV2}$ by the first phase difference φ1. Similarly, the negative rectangular wave voltage at the output voltage $V_{INV2}$ is out of phase with the negative rectangular wave voltage at the output voltage $V_{INV1}$ by the first phase difference φ1. The negative rectangular wave voltage at the output voltage $V_{INV3}$ is out of phase with the negative rectangular wave voltage at the output voltage $V_{INV2}$ by the first phase difference φ1.

The single-phase inverter 15 also outputs, on the basis of the drive signal Sp, a negative rectangular wave voltage shifted by the second phase difference φ2 from the end of the output of the positive rectangular wave voltage. In the example illustrated in FIG. 5, φ2=54° is satisfied. For the output voltage $V_{INV1}$ from the single-phase inverter $15_1$, the time period of 0°≤θo≤126° is a time period during which a positive rectangular wave voltage is output, and the time period of 180°≤θo≤306° is a time period during which a negative rectangular wave voltage is output. Therefore, for the output voltage $V_{INV1}$, the time period of the negative rectangular wave voltage starts at the timing shifted by 54°, which is the second phase difference φ2, from the end of the time period of the positive rectangular wave voltage.

Similarly, for the output voltages $V_{INV2}$ to $V_{INV8}$ from the single-phase inverters $15_2$ to $15_8$, the time period of the negative rectangular wave voltage starts at the timing shifted by the second phase difference φ2 from the end of the time period of the positive rectangular wave voltage. As is clear from the foregoing, the drive signal Sp is generated such that the output voltage $V_{INV}$ from the single-phase inverter 15 involves the second phase difference φ2.

As described above, because the output terminals $16_1$, $17_1$, $16_2$, $17_2$, . . . , $16_{n-1}$, $17_{n-1}$, $16_n$, and $17_n$ of the single-phase inverters $15_1$ to $15_8$ are connected in series, the output voltages $V_{INV1}$ to $V_{INV8}$ from the single-phase inverters $15_1$ to $15_8$ are combined. Therefore, as illustrated in FIG. 5, the waveform of the output voltage Vo from the power conversion unit 10 is a composite waveform of the output voltages $V_{INV1}$ to $V_{INV8}$.

For example, in the case of 0°≤θo<18°, the output voltage $V_{INV1}$ is +Va, the output voltages $V_{INV2}$ to $V_{INV4}$ are 0 V, and the output voltages $V_{INV5}$ to $V_{INV8}$ are −Va. Therefore, the output voltage Vo is −3×Va. In the case of 18°≤θo<36°, the output voltages $V_{INV1}$ and $V_{INV2}$ are +Va, the output voltages $V_{INV3}$ to $V_{INV5}$ are 0 V, and the output voltages $V_{INV6}$ to $V_{INV8}$ are −Va. Therefore, the output voltage Vo is −Va. In the case of 36°≤θo<54°, the output voltages $V_{INV1}$ to $V_{INV3}$ are +Va, the output voltages $V_{INV4}$ to $V_{INV6}$ are 0 V, and the output voltages $V_{INV7}$ and $V_{INV8}$ are −Va. Therefore, the output voltage Vo is +Va.

As described above, the rectangular wave voltages of the single-phase inverters $15_1$ to $15_n$ are output at different timings and combined. Therefore, the output voltage Vo from the power conversion unit 10 has a pseudo sinusoidal waveform that changes stepwise, and harmonic voltage can be suppressed. In the example illustrated in FIG. 5, the output voltage Vo changes stepwise in the range of 7×Va to −7×Va. Changing the magnitude of the second phase difference φ2 to increase or decrease the time during which the single-phase inverter 15 outputs a rectangular wave voltage controls waveform of the output voltage Vo.

The second phase difference φ2 illustrated in FIG. 6 is set larger than the second phase difference φ2 illustrated in FIG. 5. Specifically, the second phase difference φ2 illustrated in FIG. 6 is larger than the second phase difference φ2 illustrated in FIG. 5 by the time equivalent to 36°. Therefore, in the example illustrated in FIG. 6, the output voltage Vo changes stepwise in the range of 6×Va to −6×Va, and has a smaller amplitude than the output voltage Vo illustrated in FIG. 5.

Similarly, the second phase difference φ2 illustrated in FIG. 7 is set larger than the second phase difference φ2 illustrated in FIG. 6. Specifically, the second phase difference φ2 illustrated in FIG. 7 is larger than the second phase difference φ2 illustrated in FIG. 6 by the time equivalent to 36°. Therefore, in the example illustrated in FIG. 7, the output voltage Vo changes stepwise in the range of 3×Va to −3×Va, and has a smaller amplitude than the output voltage Vo illustrated in FIG. 6.

As is clear from the foregoing, the series multiplex inverter 1 can suppress harmonic voltage by providing the first phase difference φ1, and change the amplitude of the output voltage Vo by changing the second phase difference φ2.

Assume an example in which, as illustrated in FIG. 1, the load 3 which can be represented by a resonance circuit including L, C, and R equivalently is connected to the series multiplex inverter 1, and the control unit 40 performs constant output current control on the power conversion unit 10. In the example illustrated in FIG. 1, the load 3 is configured by a series resonance circuit in which one L, one C, and one R are connected in series, but the load 3 is not limited to the configuration illustrated in FIG. 1.

The output voltage Vo from the series multiplex inverter 1 can be expressed by Formula (1) below. In Formula (1) below, "m" represents the order, m=1 is the fundamental frequency, and m>1 is the harmonic frequency. Hereinafter, the term "harmonic" refers to the ninth or lower-order harmonic for convenience of description, but the harmonic is not limited to the ninth or lower-order harmonic. For example, harmonics may include the eleventh and higher-order harmonics. Because the output voltage Vo is a symmetrical wave voltage as illustrated in FIGS. 5 to 7, even-order harmonics can be ignored in the output voltage Vo.

[Formula 1]

$$Vo = 8Vdc \sum_{m=1,3,5,...} \frac{(-1)^{\frac{m-1}{2}}}{\pi m} \sin\left(\frac{m\phi_2}{2}\right) \quad (1)$$

$$\left\{\cos\left(\frac{m\phi_1}{2}\right) + \cos\left(\frac{3m\phi_1}{2}\right) + \cos\left(\frac{5m\phi_1}{2}\right) + \cos\left(\frac{7m\phi_1}{2}\right)\right\}$$

In a case where the power conversion unit 10 is controlled by constant output current control, the output voltage Vo changes depending on the impedance of the load 3. Therefore, the second phase difference φ2 for adjusting the output voltage Vo changes in the range of 0°≤φ2≤180°. When the second phase difference φ2 has the maximum value, the harmonic voltage of each order reaches the maximum value. Therefore, to calculate the maximum value of the harmonic voltage of each order on the assumption that Formula (2) below is satisfied, the harmonic voltage of each order with respect to the first phase difference φ1 can be expressed by Formula (3) below.

[Formula 2]

$$\sin\left(\frac{m\phi_2}{2}\right) = 1 \quad (2)$$

$$Vrms(m) = \quad (3)$$

$$\frac{4\sqrt{2}\,Vdc}{\pi m}\left\{\cos\left(\frac{m\phi_1}{2}\right) + \cos\left(\frac{3m\phi_1}{2}\right) + \cos\left(\frac{5m\phi_1}{2}\right) + \cos\left(\frac{7m\phi_1}{2}\right)\right\}$$

Figure 8:
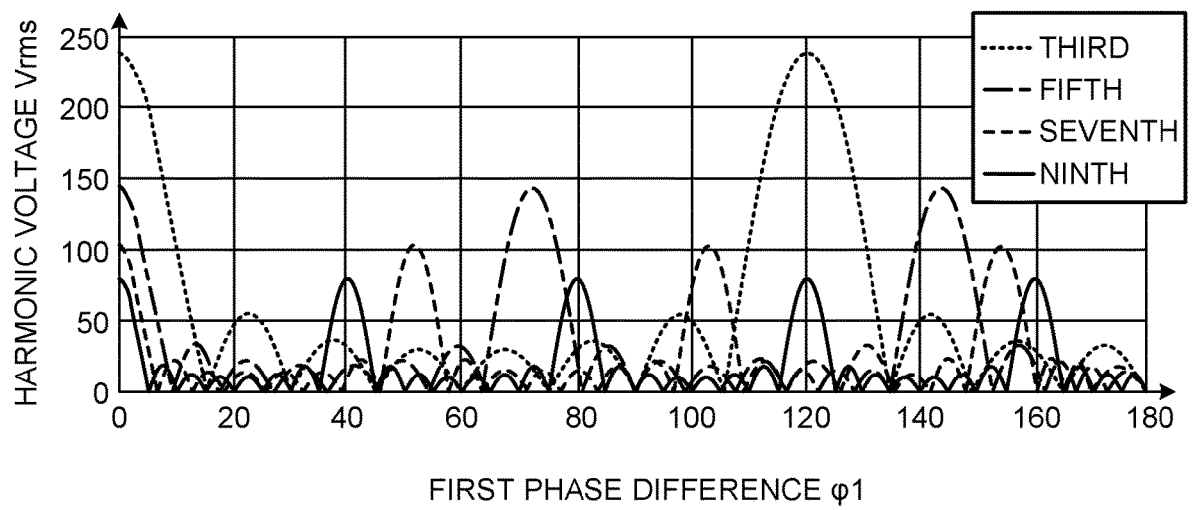
FIG. 8 is a diagram illustrating an example of the harmonic voltage of each order according to the first embodiment.
Figure 9:
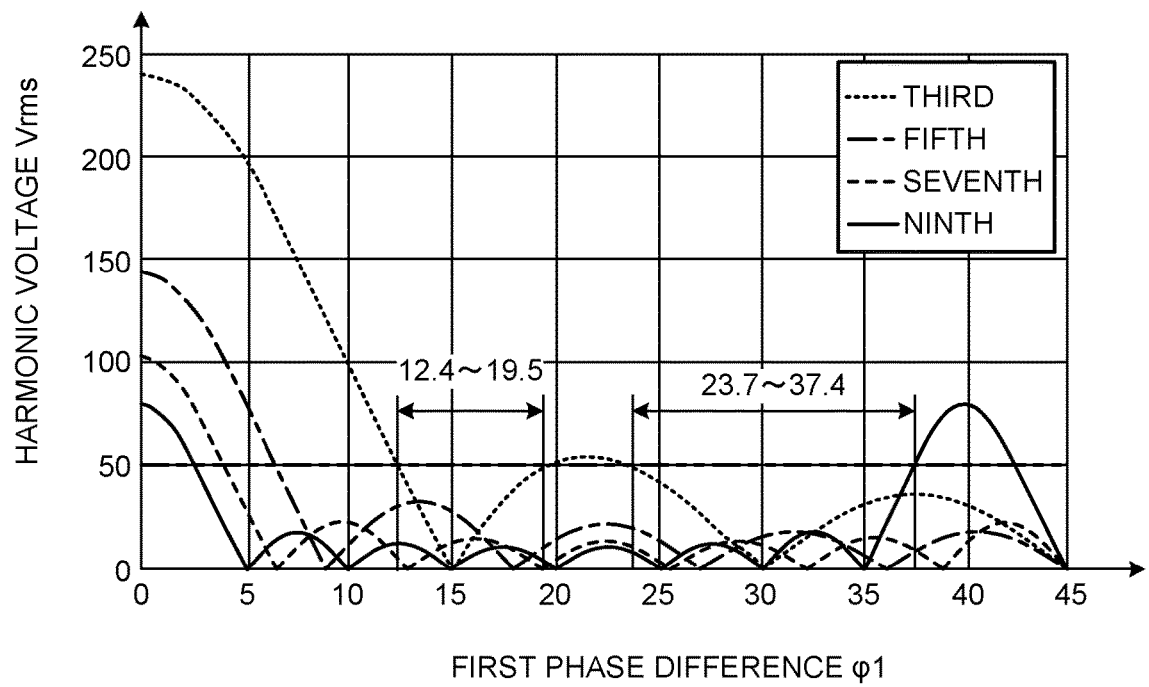
FIG. 9 is a partially enlarged diagram of FIG. 8.

FIG. 8 is a diagram illustrating an example of the harmonic voltage of each order according to the first embodiment, which shows the calculation result of the harmonic voltage of each order with respect to the first phase difference φ1 for the case Vdc=100 V in Formula (3) above. FIG. 9 is a partially enlarged diagram of FIG. 8. In FIGS. 8 and 9, the horizontal axis represents the magnitude of the first phase difference φ1, and the vertical axis represents the magnitude of the harmonic voltage of each order.

As illustrated in FIG. 8, the harmonic voltage of each order periodically increases and decreases with respect to the magnitude of the first phase difference φ1. Therefore, using such characteristics to select and control the first phase difference φ1 such that the harmonic voltage of each order has a desired value or less can suppress the harmonic voltage of each order. For example, as illustrated in FIG. 9, when the harmonic voltage of each order should be 50 [Vrms] or less, 12.4°≤φ1≤119.5° or 23.7°≤φ1≤137.4° is employed, so that the harmonic voltage of each order can be set to 50 [Vrms] or less.

As is clear from the forgoing, determining the first phase difference φ1 with reference to the calculation result illustrated in FIG. 8 can set the harmonic voltage of each order to a desired value or less. Therefore, in a case where the load 3 is a pure resistor whose characteristics do not change depending on the frequency of the output voltage Vo, the harmonic current of each order can be suppressed. Although the effect of suppressing the harmonic current can be obtained even when the characteristics of the load 3 change depending on the frequency of the output voltage Vo, it is necessary to consider the easiness of flow of the harmonic current of each order through the load 3 in order to set the harmonic current of each order to a desired value or less. In other words, determination of the first phase difference φ1 with reference to the calculation result illustrated in FIG. 8 can not suffice.

Figure 10:
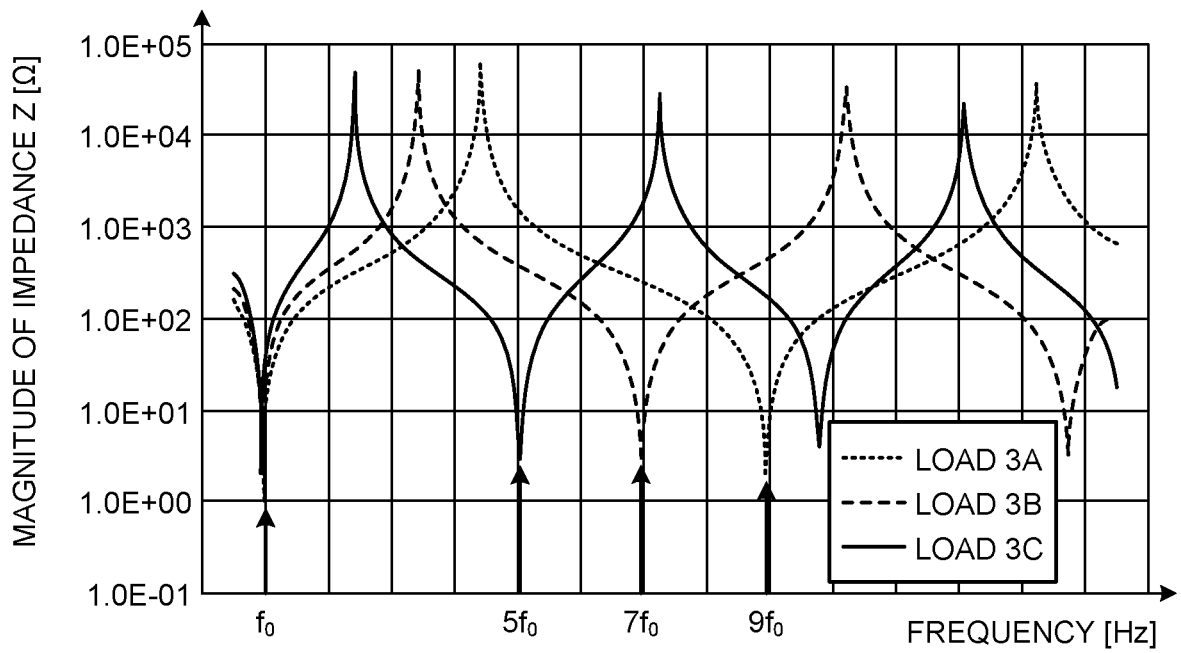
FIG. 10 is a diagram illustrating frequency characteristics of a plurality of loads according to the first embodiment.

In view of this, the series multiplex inverter 1 is configured to switch the first phase difference φ1 in consideration of the easiness of flow of the harmonic current of each order through the load 3. Here, consider the first to third loads 3A to 3C having different frequency characteristics. FIG. 10 is a diagram illustrating frequency characteristics of a plurality of loads according to the first embodiment. In FIG. 10, the horizontal axis represents the frequency, and the vertical axis represents the magnitude of the impedance Z.

As illustrated in FIG. 10, assuming that the output voltage frequency of the series multiplex inverter 1 is fo, the magnitude of the ninth impedance is small at the first load 3A, facilitating the flow of the ninth harmonic current through the first load 3A. Similarly, the seventh harmonic current easily flows through the second load 3B, and the fifth harmonic current easily flows through the third load 3C. Namely, the first to third loads 3A to 3C allow harmonic currents of different orders to easily flow therethrough.

Figure 11:
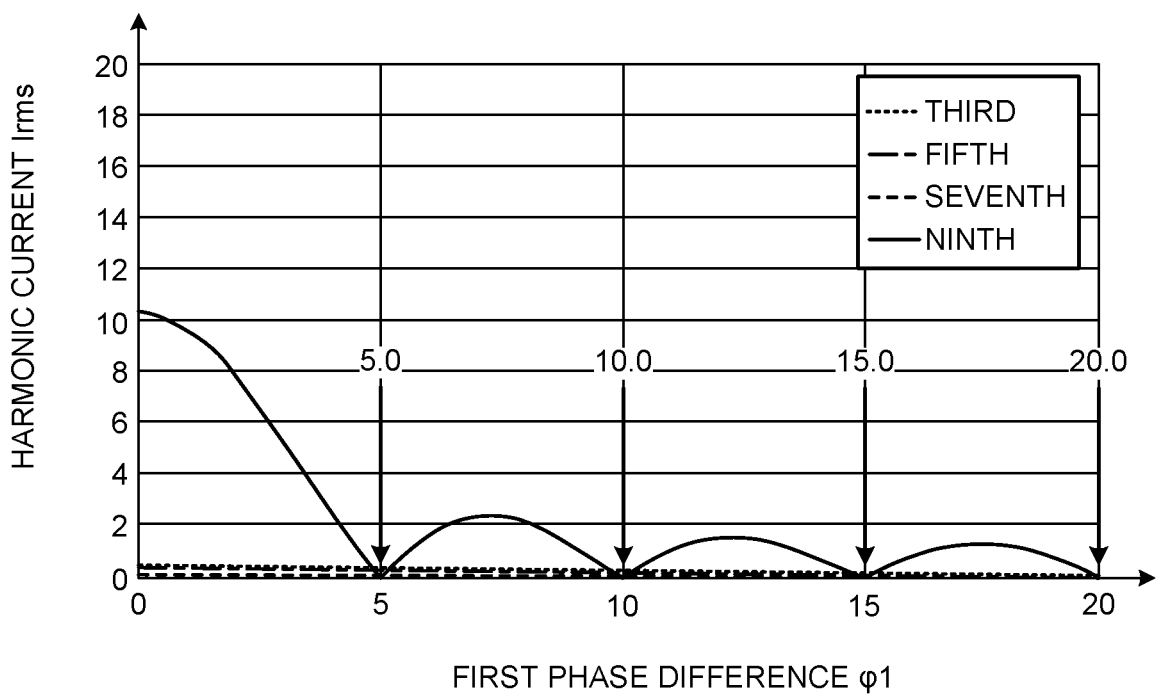
FIG. 11 is a diagram illustrating the relationship between the first phase difference and the harmonic current for the first load according to the first embodiment.
Figure 12:
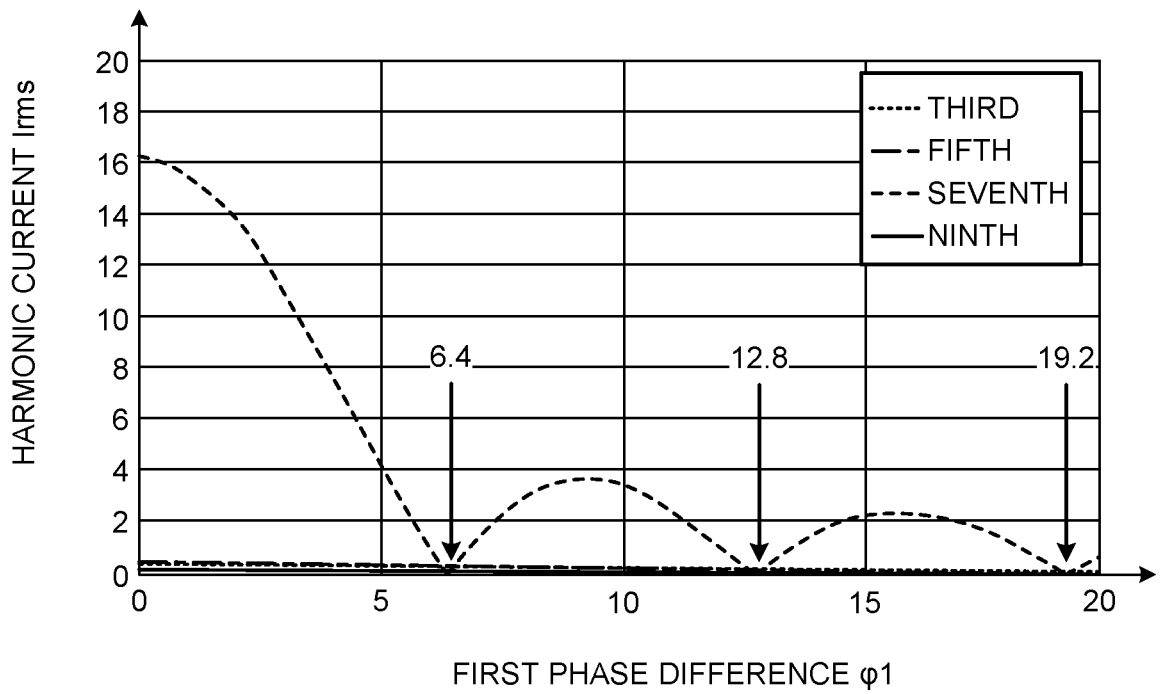
FIG. 12 is a diagram illustrating the relationship between the first phase difference and the harmonic current for the second load according to the first embodiment.
Figure 13:
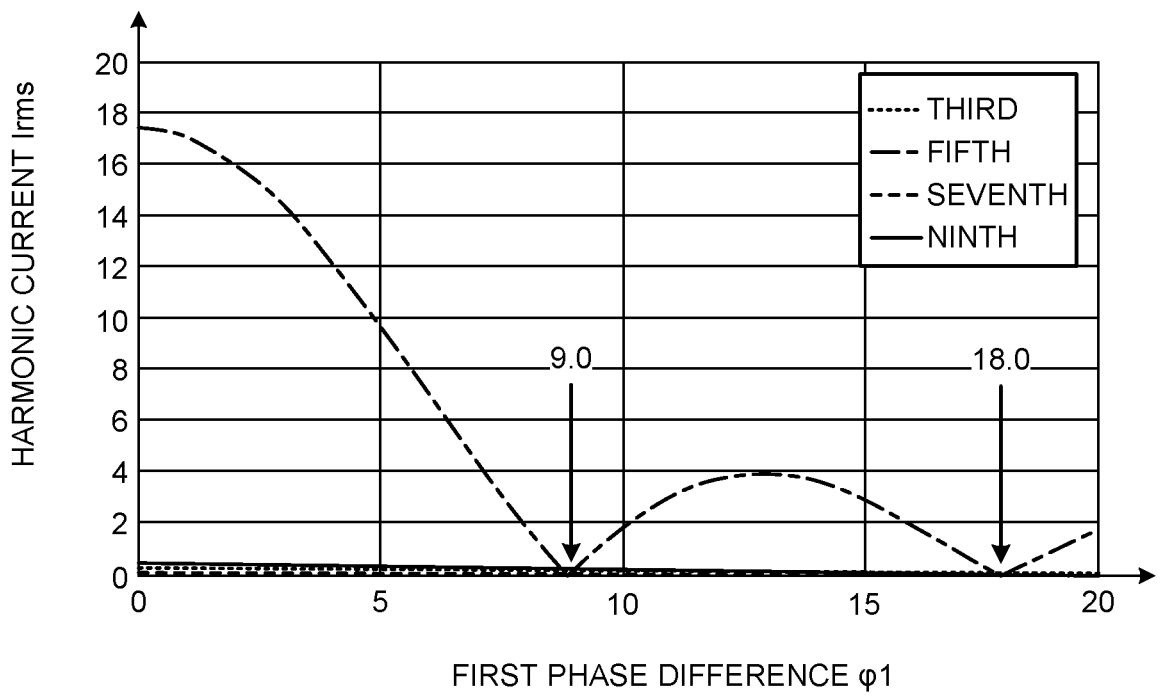
FIG. 13 is a diagram illustrating the relationship between the first phase difference and the harmonic current for the third load according to the first embodiment.

FIG. 11 is a diagram illustrating the relationship between the first phase difference and the harmonic current for the first load according to the first embodiment. FIG. 12 is a diagram illustrating the relationship between the first phase difference and the harmonic current for the second load according to the first embodiment. FIG. 13 is a diagram illustrating the relationship between the first phase difference and the harmonic current for the third load according to the first embodiment. As illustrated in FIGS. 11 to 13, the ninth harmonic current for the first load 3A, the seventh harmonic current for the second load 3B, and the fifth harmonic current for the third load 3C are dominant, and harmonic currents of other orders hardly flow.

In the case of the first load 3A, as illustrated in FIG. 11, the first phase difference φ1=5.0, 10.0, 15.0, or 20.0 [deg] at which the ninth harmonic current is close to 0 [A] is selected for generating a drive signal, whereby the harmonic current can be greatly reduced. Therefore, the harmonic filter 70 can be simplified or omitted. This makes it possible to reduce the size and cost of the series multiplex inverter 1.

Similarly, in the case of the second load 3B, as illustrated in FIG. 12, the first phase difference φ1=6.4, 12.8, or 19.2 [deg] at which the seventh harmonic current is close to 0 [A] is selected for generating a drive signal, whereby the harmonic current can be greatly reduced. In the case of the third load 3C, as illustrated in FIG. 13, the first phase difference φ1=9.0 or 18.0 [deg] at which the fifth harmonic current is close to 0 [A] is selected for generating a drive signal, whereby the harmonic current can be greatly reduced.

Reference is made back to FIG. 1 to continue the explanation of the control unit 40 of the series multiplex inverter 1. The phase difference selection unit 43 of the control unit 40 acquires information input to the operation unit 50, and inputs, to the drive signal output unit 42, the information on the first phase difference φ1 corresponding to the input content to the operation unit 50.

The drive signal generation unit 41 generates the n drive signals Sp on the basis of the first phase difference φ1 input from the phase difference selection unit 43 and the above-described second phase difference φ2. Note that the operation unit 50 is, for example, a DIP switch, but may be a detachable operation device.

The operation unit 50 is configured to receive input of the value of the first phase difference φ1 itself. In this case, the operation unit 50 can be, for example, a DIP switch including a plurality of switches through which a plurality of digits of the first phase difference φ1 can be selected and input. Further, the operation unit 50 can receive input of indirect information for setting the first phase difference φ1, instead of the value of the first phase difference φ1 itself. For example, the operation unit 50 can receive input of information indicating which of the first to third loads 3A to 3C the load 3 is. In this case, the operation unit 50 can be a DIP switch that can be switched in three stages, which facilitates input to the operation unit 50.

As the first phase difference φ1 increases, the maximum value of the output voltage Vo that can be output from the power conversion unit 10 decreases. Therefore, it is desirable that the first phase difference φ1 be set to a relatively small value. For example, when information indicating the first load 3A is input to the operation unit 50, the phase difference selection unit 43 selects 5.0 [deg] out of 5.0 [deg], 10.0 [deg], 15.0 [deg], and 20.0 [deg] as the first phase difference φ1. In this case, the maximum value of the output voltage Vo that can be output from the power conversion unit 10 can be prevented from decreasing, as compared with the case where the first phase difference φ1 is set to another value.

Similarly, when information indicating the second load 3B is input to the operation unit 50, the phase difference selection unit 43 selects 6.4 [deg] out of 6.4 [deg], 12.8 [deg], and 19.2 [deg] as the first phase difference φ1. When information indicating the third load 3C is input to the operation unit 50, the phase difference selection unit 43 selects 9.0 [deg] out of 9.0 [deg] and 18.0 [deg] as the first phase difference φ1. In this case, the maximum value of the output voltage Vo that can be output from the power conversion unit 10 can be prevented from decreasing, as compared with the case where the first phase difference φ1 is set to another value.

In the above-described examples, a single-order harmonic current is dominant and harmonic currents of other orders hardly flow. However, the series multiplex inverter 1 can suppress harmonic currents of a plurality of orders.

For suppressing harmonic currents of a plurality of orders, the first phase difference φ1 having a value that makes the values of the harmonic currents of the plurality of orders equal to or less than a threshold value is input to the operation unit 50, so that the harmonic currents of the plurality of orders can be suppressed. In this case, as described above, the first phase difference φ1 is set to as small a value as possible, so that the maximum value of the output voltage Vo that can be output from the power conversion unit 10 can be prevented from decreasing. Note that the threshold value can be the same for a plurality of harmonic current orders, or different for each harmonic current order.

As described above, the phase difference selection unit 43 can select the first phase difference φ1 from among a plurality of phase difference candidates on the basis of input to the operation unit 50. A plurality of phase difference candidates is values that can be selected by input to the operation unit 50. If information that is provided to the phase difference selection unit 43 by input to the operation unit 50 is information indicating which of the first to third loads 3A to 3C the loads 3 is, a plurality of phase difference candidates is, for example, 5.0 [deg], 6.4 [deg], and 9.0 [deg].

In the example illustrated in FIG. 1, harmonic currents of a plurality of orders flowing through the load 3 are kept below the threshold value through the selection of the first phase difference φ1 and the harmonic filter 70. Keeping harmonic currents of a plurality of orders below the threshold value is advantageous, for example, in reducing the effect of electromagnetic radiation from the series multiplex inverter 1 on other electronic devices. Further, because the harmonic current flowing through the load 3 can be suppressed through the selection of the first phase difference φ1, the harmonic filter 70 can be simplified or omitted. This makes it possible to reduce the cost and size of the harmonic filter 70 and eventually reduce the cost and size of the series multiplex inverter 1.

In a case where harmonic currents of a plurality of orders flowing through the load 3 can be kept below the threshold value through the selection of the first phase difference φ1 alone, the harmonic filter 70 may not be provided in the series multiplex inverter 1. With no harmonic filter 70 provided, the cost and size of the series multiplex inverter 1 can be prevented from increasing.

In the above-described examples, the phase difference selection unit 43 selects the first phase difference φ1 from among a plurality of phase difference candidates on the basis of input to the operation unit 50. Alternatively, the phase difference selection unit 43 can select the first phase difference φ1 from among a plurality of phase difference candidates on the basis of an external signal. For example, the phase difference selection unit 43 can select, as the first phase difference φ1, a phase difference candidate that varies depending on whether first information or second information is acquired from the outside. The first information is, for example, information that is output from the outside when the state of the load 3 is switched to the characteristics of the first load 3A, and the second information is, for example, information that is input from the outside when the state of the load 3 is switched to the characteristics of the second load 3B. Note that information that is input from the outside may be the value of the first phase difference φ1 itself.

Figure 14:
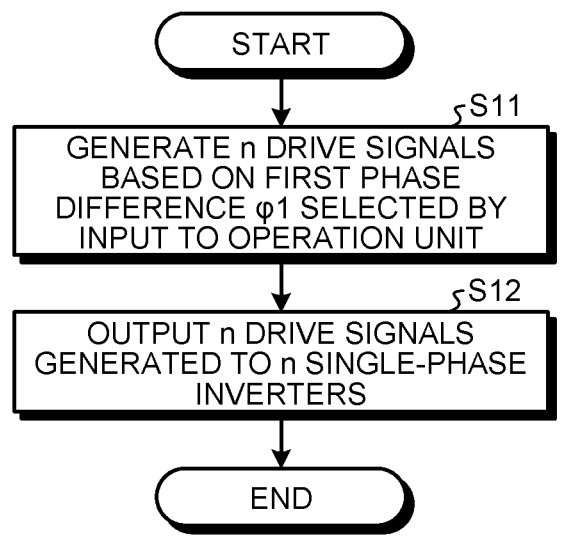
FIG. 14 is a flowchart illustrating an exemplary process that is performed by a control unit according to the first embodiment.

Next, the operation of the control unit 40 will be described using a flowchart. FIG. 14 is a flowchart illustrating an exemplary process that is performed by the control unit according to the first embodiment. As illustrated in FIG. 14, the control unit 40 generates the n drive signals Sp on the basis of the first phase difference φ1 selected by input to the operation unit 50 (step S11). Next, the control unit 40 outputs the n drive signals Sp generated in step S11 to the n single-phase inverters 15 (step S12). The control unit 40 repeatedly performs the process illustrated in FIG. 14.

Figure 15:
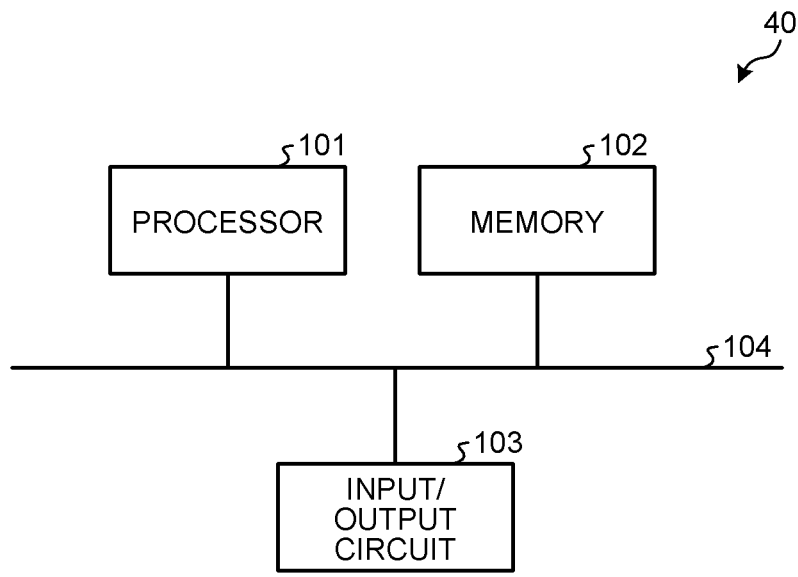
FIG. 15 is a diagram illustrating an exemplary hardware configuration of the control unit of the series multiplex inverter according to the first embodiment.

Here, a hardware configuration of the control unit 40 of the series multiplex inverter 1 according to the first embodiment will be described. FIG. 15 is a diagram illustrating an exemplary hardware configuration of the control unit of the series multiplex inverter according to the first embodiment. As illustrated in FIG. 15, the control unit 40 of the series multiplex inverter 1 includes a processor 101, a memory 102, and an input/output circuit 103. The processor 101, the memory 102, and the input/output circuit 103 can exchange data with one another via a bus 104. The memory 102 includes a recording medium on which a computer-readable program is recorded.

The processor 101 reads and executes a program stored in the memory 102 to execute the functions of the drive signal generation unit 41, the drive signal output unit 42, and the phase difference selection unit 43 described above. The processor 101 is an example of a processing circuit, and includes, for example, one or more of a central processing unit (CPU), a digital signal processer (DSP), and a system large scale integration (LSI). Examples of the memory 102 include a non-volatile or volatile semiconductor memory, a magnetic disk, a flexible disk, an optical disc, a compact disc, a mini disc, a digital versatile disc (DVD), and the like. Examples of the non-volatile or volatile semiconductor memory include a random access memory (RAM), a read only memory (ROM), a flash memory, an erasable programmable read only memory (EPROM), an electrically erasable programmable read-only memory (EEPROM, registered trademark), and the like.

Note that the control unit 40 described above may be implemented by dedicated hardware that implements the same functions as the processor 101 and the memory 102 illustrated in FIG. 15. Dedicated hardware is, for example, a single circuit, a composite circuit, a programmed processor, a parallel programmed processor, an application specific integrated circuit (ASIC), a field programmable gate array (FPGA), or a processing circuit including a combination thereof. A part of the control unit 40 may be implemented by dedicated hardware, and the rest of the control unit 40 may be implemented by the processor 101 and the memory 102 illustrated in FIG. 15.

As described above, the series multiplex inverter 1 according to the first embodiment includes the power conversion unit 10, the phase difference selection unit 43, the drive signal generation unit 41, and the drive signal output unit 42. The power conversion unit 10 includes the plurality of single-phase inverters $15_1$ to $15_n$, and the output terminals $16_1$, $17_1$, $16_2$, $17_2$, ..., $16_{n-1}$, $17_{n-1}$, $16_n$, and $17_n$ of the plurality of single-phase inverters $15_1$ to $15_n$ are connected in series. The phase difference selection unit 43 selects, from among a plurality of phase difference candidates, the first phase difference φ1 which is the phase difference between rectangular wave voltages from the plurality of single-phase inverters $15_1$ to $15_n$. The drive signal generation unit 41 generates the plurality of drive signals $Sp_1$ to $Sp_n$ that causes different ones of the different single-phase inverters $15_1$ to $15_n$ to output a plurality of rectangular wave voltages sequentially out of phase by the first phase difference φ1 selected by the phase difference selection unit 43. The drive signal output unit 42 outputs the plurality of drive signals $Sp_1$ to $Sp_n$ generated by the drive signal generation unit 41, to the plurality of single-phase inverters 15. Therefore, the series multiplex inverter 1 selects, from among a plurality of phase difference candidates, the first phase difference φ1 that can suppress the harmonic current flowing through the load 3, so that the harmonic current flowing through the load 3 can be easily suppressed by controlling each single-phase inverter 15 even when the characteristics of the load 3 vary. The harmonic current flowing through the load 3 may not be sufficiently suppressed through the selection of the first phase difference φ1 alone. In this case, however, the harmonic filter 70 having a small harmonic reduction effect can be used, as compared with the case where the first phase difference φ1 cannot be selected. Consequently, the harmonic filter 70 can be reduced in size or omitted, so that the cost and size of the series multiplex inverter 1 can be prevented from increasing.

The series multiplex inverter 1 includes the operation unit 50 that receives external input. The phase difference selection unit 43 selects the first phase difference φ1 from among a plurality of phase difference candidates on the basis of input to the operation unit 50. Consequently, for example, the first phase difference φ1 suitable for the characteristics of the load 3 connected to the series multiplex inverter 1 can be easily selected by the installer of the series multiplex inverter 1 operating the operation unit 50.

Second Embodiment

The second embodiment is different from the first embodiment in that the impedance of the load 3 is detected so that the first phase difference φ1 can be selected from among a plurality of phase difference candidates on the basis of the detected impedance. In the following description, components having the same functions as those in the first embodiment are denoted by the same reference signs, and descriptions thereof are omitted. The difference from the series multiplex inverter 1 according to the first embodiment is mainly described.

Figure 16:
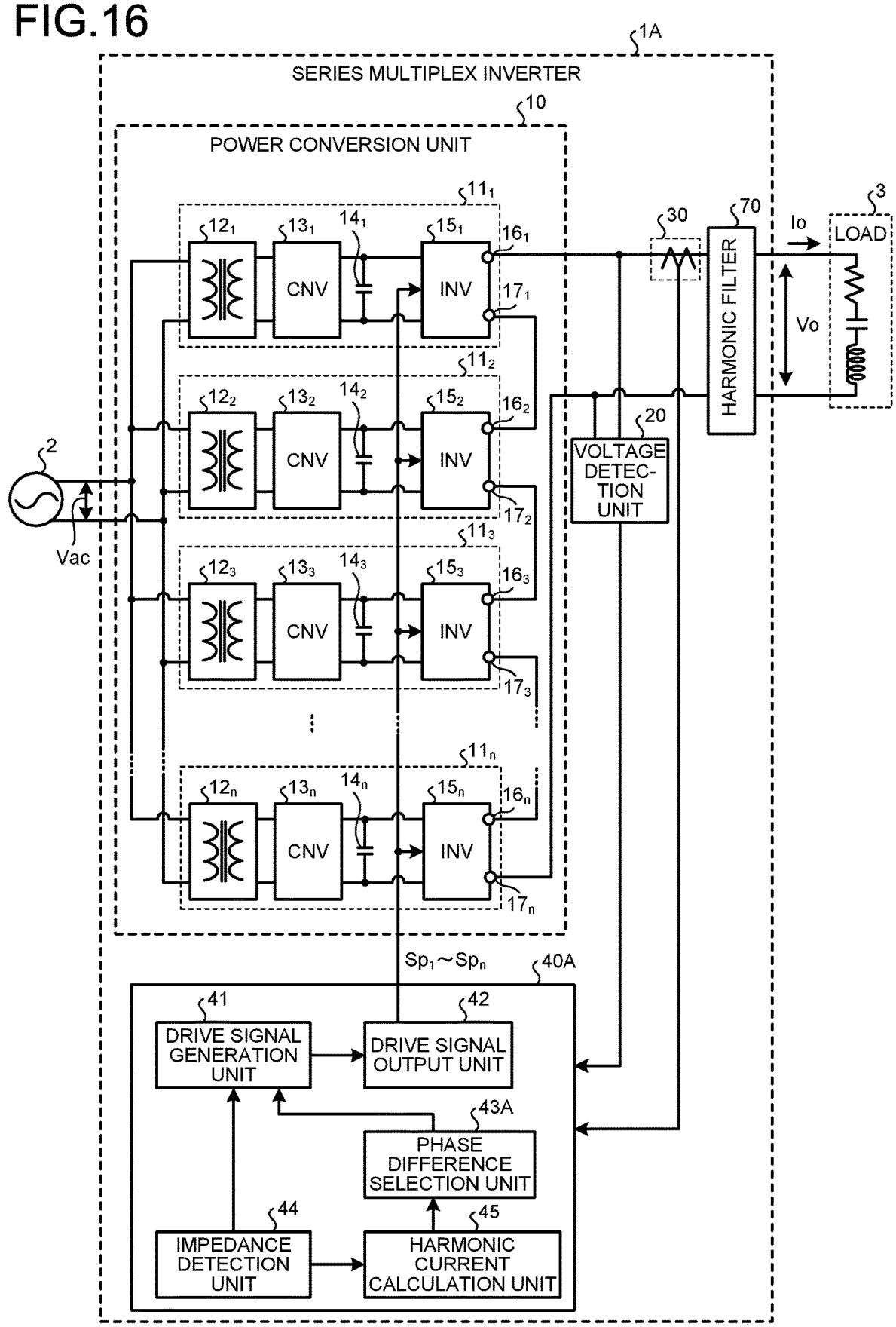
FIG. 16 is a diagram illustrating an exemplary configuration of a series multiplex inverter according to a second embodiment.

FIG. 16 is a diagram illustrating an exemplary configuration of a series multiplex inverter according to the second embodiment. As illustrated in FIG. 16, the series multiplex inverter 1A according to the second embodiment includes the power conversion unit 10, the voltage detection unit 20, the current detection unit 30, and a control unit 40A.

The control unit 40A includes the drive signal generation unit 41, the drive signal output unit 42, a phase difference selection unit 43A, an impedance detection unit 44, and a harmonic current calculation unit 45.

The impedance detection unit 44 detects the impedance $Z_m$ (m=3, 5, 7, or 9), for the harmonic of each order, of the load 3 connected to the power conversion unit 10 on the basis of the output voltage Vo detected by the voltage detection unit 20 and the output current Io detected by the current detection unit 30. Note that the impedance $Z_m$ is not limited to the impedance for the ninth or lower-order harmonic, and may include the impedance for the eleventh or higher-order harmonic. That is, the impedance detection unit 44 can calculate the impedance for harmonics of a plurality of orders set in advance.

For example, the impedance detection unit 44 acquires the detected voltage value Vdet repeatedly output from the voltage detection unit 20 and the detected current value Idet repeatedly output from the current detection unit 30. Then, the impedance detection unit 44 performs a discrete Fourier transform on the detected voltage value Vdet and the detected current value Idet, using a sampling period that is an integral multiple of the output voltage frequency fo. Through the discrete Fourier transform, the impedance detection unit 44 extracts the harmonic component of each order included in the output current Io and the harmonic component of each order included in the output voltage Vo. Hereinafter, the m-order harmonic component included in the output voltage Vo is referred to as the harmonic voltage $Vo_m$, and the m-order harmonic component included in the output current Io is referred to as the harmonic current $Io_m$. Note that "m" is a positive odd number equal to or greater than three.

Note that, instead of the discrete Fourier transform, the impedance detection unit 44 can use a method and algorithm for extracting a plurality of high-order frequency components included in the output current Io to extract the harmonic component of each order of the output current Io and the harmonic component of each order of the output voltage Vo.

In a case where the Fourier transform is performed by the impedance detection unit 44, the m-order harmonic voltage $Vo_m$ included in the output voltage Vo and the m-order harmonic current $Io_m$ included in the output current Io are expressed in complex notation by Formulas (4) and (5) below. In Formulas (4) and (5) below, "$Vo_m Re$" indicates the real part of $Vo_m$, "$Io_m Re$" indicates the real part of $Io_m$, "$Vo_m Im$" indicates the imaginary part of $Vo_m$, "$Io_m Im$" indicates the imaginary part of $Io_m$, and "j" indicates an imaginary unit.

$$Vo_m = Vo_m Re + j \times Vo_m Im \quad (4)$$

$$Io_m = Io_m Re + j \times Io_m Im \quad (5)$$

The impedance detection unit 44 can compute the impedance $Z_m$ through calculations of Formulas (6) and (7) below. In Formula (7), $Re(Z_m)$ indicates the real part of the impedance $Z_m$, and $Im(Z_m)$ indicates the imaginary part of the impedance $Z_m$.

$$Z_m = Vo_m / Io_m \quad (6)$$

$$|Z_m| = \sqrt{(Re(Z_m)^2 + Im(Z_m)^2)} \quad (7)$$

Note that the impedance detection unit 44 can also cause the drive signal generation unit 41 to generate the drive signals $Sp_1$ to $Sp_n$ for sweeping the output voltage frequency fo. In this case, the drive signal output unit 42 outputs, to the single-phase inverters $15_1$ to $15_n$, the drive signals $Sp_1$ to $Sp_n$ output from the drive signal generation unit 41, so that the power conversion unit 10 causes the output voltage Vo whose output voltage frequency fo sweeps to be output from the series multiplex inverter 1A to the load 3. The impedance detection unit 44 can also calculate the impedance $Z_m$ for the harmonic of each order on the basis of the detected voltage value Vdet and the detected current value Idet obtained when the output voltage frequency fo is the frequency of the harmonic of each order.

On the basis of the impedance $Z_m$ of the load 3 detected by the impedance detection unit 44 and the theoretical formula for harmonic voltage expressed by Formula (3) above, the harmonic current calculation unit 45 calculates the harmonic current of each order flowing through the load 3. For example, the harmonic current calculation unit 45 can change the value of the first phase difference $\varphi 1$ in Formula (3) above to thereby compute the harmonic voltage $Vo_m$ for each value of the first phase difference $\varphi 1$ on the basis of Formula (3) above.

The phase difference selection unit 43A selects, from among a plurality of phase difference candidates, the first phase difference $\varphi 1$ that makes the harmonic current $Io_m$ of each order detected by the harmonic current calculation unit 45 equal to or less than the threshold value Ith. The threshold value Ith can be common to the harmonic current $Io_m$ of each order, or the threshold value Ith can be different for the harmonic current $Io_m$ of each order.

Figure 17:
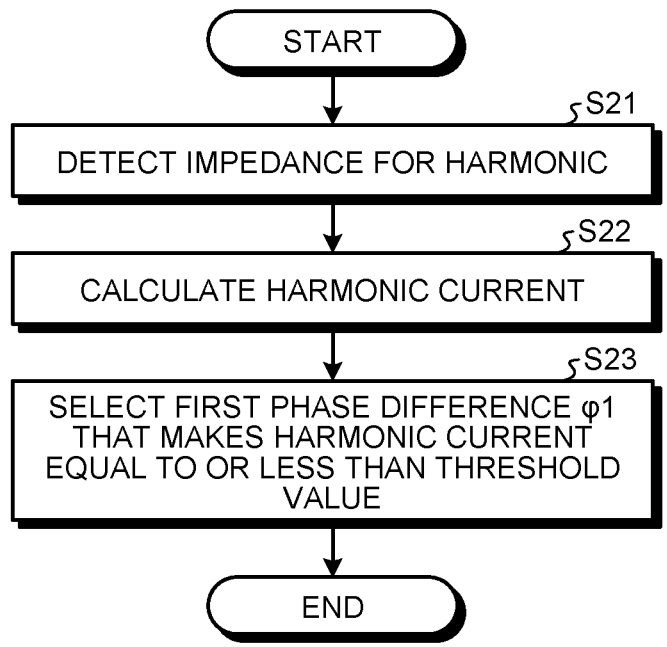
FIG. 17 is a flowchart illustrating an exemplary process that is performed by a control unit according to the second embodiment.

Next, a process that is performed by the control unit 40A will be described using a flowchart. FIG. 17 is a flowchart illustrating an exemplary process that is performed by the control unit according to the second embodiment. As illustrated in FIG. 17, the control unit 40A detects the impedance $Z_m$ for the harmonic of each order (step S21).

Next, the control unit 40A calculates the harmonic current $Io_m$ of each order on the basis of the impedance $Z_m$ of the load 3 (step S22). The control unit 40A selects the first phase difference $\varphi 1$ that makes the harmonic current $Io_m$ of each order equal to or less than the threshold value Ith (step S23). The process illustrated in FIG. 17 is started by the control unit 40A when, for example, a button (not illustrated) provided on the series multiplex inverter 1A is pressed. Further, the control unit 40A can execute the process illustrated in FIG. 17 at a preset timing. A preset timing is a timing that can be freely set, and may be, for example, a timing that occurs once a preset period such as once a day and once a month.

An exemplary hardware configuration of the control unit 40A of the series multiplex inverter 1A according to the second embodiment is the same as the exemplary hardware configuration illustrated in FIG. 15. The processor 101 can read and execute a program stored in the memory 102 to execute the functions of the drive signal generation unit 41, the drive signal output unit 42, the phase difference selection unit 43A, the impedance detection unit 44, and the harmonic current calculation unit 45.

As described above, the series multiplex inverter 1A according to the second embodiment includes the voltage detection unit 20, the current detection unit 30, the impedance detection unit 44, and the harmonic current calculation unit 45. The voltage detection unit 20 detects the output voltage Vo from the power conversion unit 10. The current detection unit 30 detects the output current Io from the power conversion unit 10. The impedance detection unit 44 detects the impedance $Z_m$ of the load 3 connected to the power conversion unit 10 on the basis of the output voltage Vo detected by the voltage detection unit 20 and the output current Io detected by the current detection unit 30. The harmonic current calculation unit 45 calculates the harmonic currents $Io_m$ of a plurality of orders flowing through the load 3 on the basis of the impedance $Z_m$ of the load 3 detected by the impedance detection unit 44. The phase difference selection unit 43A selects, from among a plurality of phase difference candidates, the first phase difference $\varphi 1$ that makes the harmonic currents $Io_m$ of the plurality of orders detected by the harmonic current calculation unit 45 equal to or less than the threshold value Ith. Consequently, the first phase difference $\varphi 1$ having an appropriate value is automatically selected without manual setting of the first phase difference $\varphi 1$, so that the harmonic current $Io_m$ flowing through the load 3 can be easily suppressed.

In a case where two or more of the plurality of phase difference candidates make the harmonic currents $Io_m$ of the plurality of orders equal to or less than the threshold value Ith, the phase difference selection unit 43A selects, as the first phase difference $\varphi 1$, the smallest phase difference candidate of the two or more phase difference candidates that make the harmonic currents $Io_m$ of the plurality of orders equal to or less than the threshold value Ith. In this case, the maximum value of the output voltage Vo that can be output from the power conversion unit 10 can be prevented from decreasing, as compared with the case where the first phase difference $\varphi 1$ is set to another value.

Although the above-described series multiplex inverters 1 and 1A include the n transformers 12, the series multiplex inverters 1 and 1A may include one multi-output transformer instead of the n transformers 12. In this case, the primary side of the multi-output transformer is connected to the single-phase AC power supply 2, and AC voltage is output from the n secondary sides of the multi-output transformer to the n rectifier circuits 13.

In the above-described examples, the single-phase AC voltage Vac from the single-phase AC power supply 2 is converted into the DC voltage Vdc. However, the power supply is not limited to the single-phase AC power supply 2. For example, the series multiplex inverters 1 and 1A may be configured to convert three-phase AC voltage from a three-phase AC power supply, in place of the single-phase AC power supply 2, into the DC voltage Vdc. In this case, a three-phase transformer is used as the transformer 12, and a three-phase rectifier circuit is used as the rectifier circuit 13, whereby three-phase AC voltage can be converted into the DC voltage Vdc.

In the above-described examples, the DC voltage Vdc is input to each single-phase inverter 15 from an independent DC power supply including the transformer 12, the rectifier circuit 13, and the capacitor 14. Alternatively, the DC voltage Vdc may be input from one DC power supply to the n single-phase inverters 15. In this case, the output voltages $V_{INV}$ from the individual single-phase inverters 15 are input to the primary sides of n transformers provided on a single-phase-inverter-by-single-phase inverter basis. The secondary sides of the n transformers are connected in series, whereby the output voltages $V_{INV}$ from the single-phase inverters 15 are combined and output to the load 3.

The configurations described in the above-mentioned embodiments indicate examples of the contents of the present invention. The configurations can be combined with another well-known technique, and some of the configurations can be omitted or changed in a range not departing from the gist of the present invention.

REFERENCE SIGNS LIST 1, 1A series multiplex inverter; 2 single-phase AC power supply; 3, 3A, 3B, 3C load; 10 power conversion unit; $11_1$ to $11_n$ power conversion block; 12, $12_1$ to $12_n$ transformer; 13, $13_1$ to $13_n$ rectifier circuit; 14, $14_1$ to $14_n$ capacitor; 15, $15_1$ to $15_n$ single-phase inverter; $16_1$ to $16_n$, $17_1$ to $17_n$ output terminal; 18 gate driver; 20 voltage detection unit; 30 current detection unit; 40, 40A control unit; 41 drive signal generation unit; 42 drive signal output unit; 43, 43A phase difference selection unit; 44 impedance detection unit; 45 harmonic current calculation unit; 50 operation unit; 60 effective value calculation unit; 61 current command output unit; 62 subtractor; 63 current control unit; 64 carrier wave output unit; 65 comparator; 66 signal generation unit; 70 harmonic filter; Sp, $Sp_1$ to $Sp_n$ drive signal.

The invention claimed is:

1. A series multiplex inverter comprising:
power conversion circuitry including a plurality of single-phase inverters having output terminals connected in series;
phase difference selection circuitry to select, from among a plurality of phase difference candidates, a phase difference between rectangular wave voltages from the plurality of single-phase inverters, the phase difference selected by the phase difference selection circuitry being a single value;
drive signal generation circuitry including a signal generation unit to receive the selected phase difference directly from the phase difference selection circuitry and generate a plurality of drive signals that causes different single-phase inverters to output a plurality of rectangular wave voltages sequentially out of phase by the phase difference selected by the phase difference selection circuitry, wherein each of the plurality of drive signals is generated based on the same single value selected by the phase difference selection circuitry; and
drive signal output circuitry to output the plurality of drive signals generated by the drive signal generation circuitry to the plurality of single-phase inverters.

2. The series multiplex inverter according to claim 1, comprising
operation circuitry to receive input, wherein
the phase difference selection circuitry selects the phase difference from among the plurality of phase difference candidates on a basis of the input to the operation circuitry.

3. A series multiplex inverter comprising:
power conversion circuitry including a plurality of single-phase inverters having output terminals connected in series;
phase difference selection circuitry to select, from among a plurality of phase difference candidates, a phase difference between rectangular wave voltages from the plurality of single-phase inverters;
drive signal generation circuitry to generate a plurality of drive signals that causes different single-phase inverters to output a plurality of rectangular wave voltages sequentially out of phase by the phase difference selected by the phase difference selection circuitry;
drive signal output circuitry to output the plurality of drive signals generated by the drive signal generation circuitry to the plurality of single-phase inverters;
voltage detection circuitry to detect an output voltage from the power conversion circuitry;
current detection circuitry to detect an output current from the power conversion circuitry;
impedance detection circuitry to detect an impedance of a load connected to the power conversion circuitry, on the basis of the output voltage detected by the voltage detection circuitry and the output current detected by the current detection circuitry; and
harmonic current calculation circuitry to calculate harmonic currents of a plurality of orders flowing through the load on the basis of the impedance of the load detected by the impedance detection circuitry, wherein
the phase difference selection circuitry selects, from among the plurality of phase difference candidates, the phase difference that makes the harmonic currents of the plurality of orders detected by the harmonic current calculation circuitry equal to or less than a threshold value.

4. The series multiplex inverter according to claim 3, wherein
in a case where two or more of the plurality of phase difference candidates make the harmonic currents of the plurality of orders equal to or less than the threshold value, the phase difference selection circuitry selects, as the phase difference, a smallest phase difference candidate of the two or more phase difference candidates that make the harmonic currents of the plurality of orders equal to or less than the threshold value.

* * * * *